(12) United States Patent
Zeng et al.

(10) Patent No.: US 10,412,393 B2
(45) Date of Patent: Sep. 10, 2019

(54) INTRA-FRAME ENCODING METHOD, INTRA-FRAME DECODING METHOD, ENCODER, AND DECODER

(71) Applicant: Huawei Technologies Co., Ltd., Shenzhen (CN)

(72) Inventors: Bing Zeng, Chengdu (CN); Chen Chen, Chengdu (CN); Yin Zhao, Hangzhou (CN); Haitao Yang, Shenzhen (CN); Shuyuan Zhu, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 139 days.

(21) Appl. No.: 15/694,440

(22) Filed: Sep. 1, 2017

(65) Prior Publication Data

US 2018/0007367 A1 Jan. 4, 2018

Related U.S. Application Data

(63) Continuation of application No. PCT/CN2015/096021, filed on Nov. 30, 2015.

(30) Foreign Application Priority Data

Mar. 3, 2015 (CN) .......................... 2015 1 0094314

(51) Int. Cl.
*H04N 19/117* (2014.01)
*H04N 19/159* (2014.01)
(Continued)

(52) U.S. Cl.
CPC ......... *H04N 19/159* (2014.11); *H04N 19/105* (2014.11); *H04N 19/122* (2014.11);
(Continued)

(58) Field of Classification Search
CPC .... H04N 19/176; H04N 19/61; H04N 19/593; H04N 19/117; H04N 19/105
(Continued)

(56) References Cited

U.S. PATENT DOCUMENTS

| 8,165,195 B2 | 4/2012 | Song |
| 2007/0053433 A1 | 3/2007 | Song |

(Continued)

FOREIGN PATENT DOCUMENTS

| CN | 1929611 A | 3/2007 |
| CN | 101783957 A | 7/2010 |

(Continued)

OTHER PUBLICATIONS

Machine Translation and Abstract of Japanese Publication No. JP2007074726, Mar. 22, 2007, 34 pages.

(Continued)

*Primary Examiner* — Patricia I Young
(74) *Attorney, Agent, or Firm* — Conley Rose, P.C.

(57) ABSTRACT

An intra-frame encoding method, an intra-frame decoding method, an encoder, and a decoder, where the intra-frame encoding method includes obtaining reference pixel values of a current picture block obtaining a predicted value of a first-type pixel in the current picture block according to the reference pixel values of the current picture block using an intra-frame prediction algorithm, obtaining residual values of the first-type pixel, obtaining transform coefficients according to the residual values of the first-type pixel, quantizing the transform coefficients, reconstructing the first-type pixel according to the quantized transform coefficients and the predicted value of the first-type pixel, and obtaining a reconstructed value of the second-type pixel according to the reconstructed value of the first-type pixel (Continued)

using an interpolation method. Hence, flexible encoding can be implemented, and encoding efficiency can be improved.

16 Claims, 8 Drawing Sheets

(51) Int. Cl.
| | |
|---|---|
| H04N 19/122 | (2014.01) |
| H04N 19/61 | (2014.01) |
| H04N 19/124 | (2014.01) |
| H04N 19/105 | (2014.01) |
| H04N 19/182 | (2014.01) |
| H04N 19/176 | (2014.01) |
| H04N 19/593 | (2014.01) |
| H04N 19/132 | (2014.01) |
| H04N 19/136 | (2014.01) |
| H04N 19/18 | (2014.01) |
| H04N 19/82 | (2014.01) |
| H04N 19/59 | (2014.01) |

(52) U.S. Cl.
CPC ......... *H04N 19/124* (2014.11); *H04N 19/132* (2014.11); *H04N 19/136* (2014.11); *H04N 19/176* (2014.11); *H04N 19/18* (2014.11); *H04N 19/182* (2014.11); *H04N 19/59* (2014.11); *H04N 19/593* (2014.11); *H04N 19/61* (2014.11); *H04N 19/82* (2014.11)

(58) Field of Classification Search
USPC .................................................. 375/240.03
See application file for complete search history.

(56) References Cited

U.S. PATENT DOCUMENTS

| | | | |
|---|---|---|---|
| 2008/0198931 A1 | 8/2008 | Chappalli et al. | |
| 2011/0243230 A1 | 10/2011 | Liu | |
| 2012/0201300 A1* | 8/2012 | Kim ..................... | H04N 19/105 375/240.12 |
| 2012/0294365 A1* | 11/2012 | Zheng .................. | H04N 19/176 375/240.16 |
| 2013/0051468 A1 | 2/2013 | Tao et al. | |
| 2013/0058411 A1 | 3/2013 | Xu et al. | |
| 2013/0243091 A1 | 9/2013 | Ye et al. | |

FOREIGN PATENT DOCUMENTS

| | | |
|---|---|---|
| CN | 102893606 A | 1/2013 |
| CN | 102917226 A | 2/2013 |
| CN | 104702962 A | 6/2015 |
| JP | 2007074726 A | 3/2007 |
| JP | 2014531154 A | 11/2014 |
| WO | 2013040287 A1 | 3/2013 |

OTHER PUBLICATIONS

Foreign Communication From a Counterpart Application, Japanese Application No. 2017-546177, Japanese Office Action dated Oct. 16, 2018, 4 pages.
Foreign Communication From a Counterpart Application, Japanese Application No. 2017-546177, English Translation of Japanese Office Action dated Oct. 16, 2018, 5 pages.
Machine Translation and Abstract of Chinese Publication No. CN102917226, Feb. 6, 2013, 7 pages.
Machine Translation and Abstract of Chinese Publication No. CN104702962, Jun. 10, 2015, 59 pages.
Zhu, S., et al. "An Enhanced Block-Based Hierarchical Image Coding Scheme," IEEE 2012, pp. 2513-2516.
Shen, G., et al.,"A New Padding Technique for Coding of Arbitrarily-Shaped Image/Video Segments," Proceedings. 1999 International Conference, Oct. 28, 1999, pp. 838-842.
Zhu, S., et al., "A Novel Enhancement for Hierarchical Image Coding," J. Vis. Commun. Image R., Elsevier, Oct. 23, 2012, 11 pages.
Zhu, S., et al.,"Constrained Quantization in the Transform Domain With Applications in Arbitrarily-Shaped Object Coding," IEEE Transactions on Circuits and Systems for Video Technology, vol. 20, Nol. 11, Nov. 2010, pp. 1385-1394.
"Series H: Audiovisual and Multimedia Systems, Infrastructure of audiovisual services—Coding of moving video, Advanced video coding for generic audiovisual services," ITU-T, H.264, Feb. 2014, 790 pages.
Foreign Communication From a Counterpart Application, Chinese Application No. 201510094314.7, Chinese Search Report dated Jun. 12, 2017, 3 pages.
Foreign Communication From a Counterpart Application, Chinese Application No. 201510094314.7, Chinese Office Action dated Jun. 20, 2017, 7 pages.
Foreign Communication From a Counterpart Application, PCT Application No. PCT/CN2015/096021, English Translation of International Search Report dated Mar. 3, 2016, 3 pages.
Foreign Communication From a Counterpart Application, PCT Application No. PCT/CN2015/096021, English Translation of Written Opinion dated Mar. 3, 2016, 8 pages.
Shen, G., et al., "Arbitrarily Shaped Transform Coding Based on a New Padding Technique," XP11014153A, IEEE Transactions on Circuits and Systems for Video Technology, vol. 11, No. 1, Jan. 2001, pp. 67-79.
Wu Q., et al., "Mode dependent down-sampling and interpolation scheme for high efficiency video coding," XP028546333, Signal Processing: Image Communication, vol. 28, No. 6, Mar. 27, 2013, pp. 581-596.
Zhu, S., et al., "Coding of Arbitrarily-Shaped Image Blocks Based on a Constrained Quantization," XP31312691A, IEEE International Conference on Multimedia and Expo, Jun. 23-Apr. 26, 2008, pp. 193-196.
Chen, C., et al., "A new block-based coding method for HEVC Intra coding," XP33182464, IEEE International Conference on Multimedia & Expo Workshops, Jun. 29-Jul. 3, 2015, 6 pages.
Foreign Communication From a Counterpart Application, European Application No. 15883829.2, Extended European Search Report dated Jan. 18, 2018, 12 pages.

* cited by examiner

| 2 | 2 | 2 | 1 |
|---|---|---|---|
| 2 | 1 | 2 | 1 |
| 2 | 2 | 2 | 1 |
| 1 | 1 | 1 | 1 |

FIG. 2A

| 2 | 2 | 2 | 1 |
|---|---|---|---|
| 2 | 2 | 2 | 1 |
| 2 | 2 | 2 | 1 |
| 1 | 1 | 1 | 1 |

FIG. 2B

| 2 | 2 | 2 | 1 |
|---|---|---|---|
| 2 | 2 | 2 | 2 |
| 2 | 2 | 2 | 1 |
| 1 | 2 | 1 | 1 |

FIG. 2C

| 2 | 1 | 2 | 1 |
|---|---|---|---|
| 1 | 2 | 1 | 1 |
| 2 | 1 | 2 | 1 |
| 1 | 1 | 1 | 2 |

FIG. 2D

| 2 | 2 | 2 | 1 |
|---|---|---|---|
| 2 | 1 | 2 | 2 |
| 2 | 2 | 2 | 1 |
| 1 | 2 | 1 | 1 |

FIG. 2E

| 2 | 2 | 2 | 2 |
|---|---|---|---|
| 2 | 1 | 2 | 1 |
| 2 | 2 | 2 | 2 |
| 2 | 1 | 2 | 1 |

FIG. 2F

| 2 | 2 | 2 | 2 |
|---|---|---|---|
| 2 | 1 | 2 | 1 |
| 2 | 2 | 1 | 2 |
| 2 | 1 | 2 | 1 |

FIG. 2G

| 2 | 2 | 2 | 2 |
|---|---|---|---|
| 1 | 1 | 1 | 1 |
| 2 | 2 | 2 | 2 |
| 1 | 1 | 1 | 1 |

FIG. 2H

| 2 | 2 | 2 | 1 | 2 | 2 | 2 | 1 |
|---|---|---|---|---|---|---|---|
| 2 | 1 | 2 | 1 | 2 | 1 | 2 | 1 |
| 2 | 2 | 2 | 1 | 2 | 2 | 2 | 1 |
| 1 | 1 | 1 | 1 | 1 | 1 | 1 | 1 |
| 2 | 2 | 2 | 1 | 2 | 2 | 2 | 1 |
| 2 | 1 | 2 | 1 | 2 | 1 | 2 | 1 |
| 2 | 2 | 2 | 1 | 2 | 2 | 2 | 1 |
| 1 | 1 | 1 | 1 | 1 | 1 | 1 | 1 |

FIG. 3A

| 2 | 2 | 2 | 2 | 2 | 2 | 2 | 1 |
|---|---|---|---|---|---|---|---|
| 2 | 1 | 2 | 1 | 2 | 1 | 2 | 1 |
| 2 | 2 | 2 | 2 | 2 | 2 | 2 | 1 |
| 2 | 2 | 2 | 1 | 2 | 2 | 2 | 1 |
| 2 | 2 | 2 | 2 | 2 | 2 | 2 | 1 |
| 2 | 1 | 2 | 1 | 2 | 1 | 2 | 1 |
| 2 | 2 | 2 | 2 | 2 | 2 | 2 | 1 |
| 1 | 1 | 1 | 1 | 1 | 1 | 1 | 1 |

FIG. 3B

| 2 | 2 | 1 | 2 | 1 | 2 | 2 | 1 |
|---|---|---|---|---|---|---|---|
| 2 | 1 | 2 | 1 | 2 | 1 | 2 | 2 |
| 1 | 2 | 1 | 2 | 1 | 2 | 2 | 1 |
| 2 | 1 | 2 | 1 | 2 | 1 | 2 | 1 |
| 1 | 2 | 1 | 2 | 1 | 2 | 2 | 1 |
| 2 | 1 | 2 | 1 | 2 | 1 | 2 | 1 |
| 2 | 2 | 2 | 2 | 2 | 2 | 1 | 1 |
| 1 | 2 | 1 | 1 | 1 | 1 | 1 | 1 |

FIG. 3C

| 2 | 2 | 1 | 2 | 1 | 2 | 1 | 2 |
|---|---|---|---|---|---|---|---|
| 2 | 1 | 2 | 1 | 2 | 1 | 2 | 1 |
| 1 | 2 | 1 | 2 | 1 | 2 | 1 | 2 |
| 2 | 1 | 2 | 1 | 2 | 1 | 1 | 1 |
| 2 | 2 | 2 | 2 | 2 | 2 | 2 | 2 |
| 1 | 1 | 1 | 1 | 1 | 1 | 1 | 1 |
| 2 | 2 | 2 | 2 | 2 | 1 | 2 | 1 |
| 1 | 1 | 1 | 1 | 1 | 1 | 1 | 1 |

FIG. 3D

| $p_{11}$ | $p_{12}$ | $p_{13}$ | $x_{14}$ |
|---|---|---|---|
| $p_{21}$ | $x_{22}$ | $p_{23}$ | $x_{24}$ |
| $p_{31}$ | $p_{32}$ | $p_{33}$ | $x_{34}$ |
| $x_{41}$ | $x_{42}$ | $x_{43}$ | $x_{44}$ |
4x4 DST ⟹
| $y_{11}$ | $y_{12}$ | $y_{13}$ | $y_{14}$ |
|---|---|---|---|
| $y_{21}$ | $y_{22}$ | 0 | 0 |
| $y_{31}$ | 0 | 0 | 0 |
| $y_{41}$ | 0 | 0 | 0 |
FIG. 4
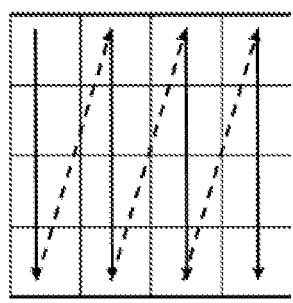
FIG. 5A
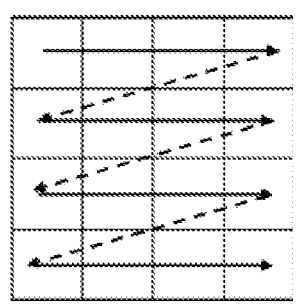
FIG. 5B
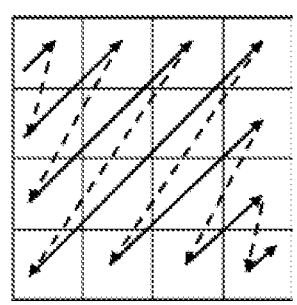
FIG. 5C

900

1000

INTRA-FRAME ENCODING METHOD, INTRA-FRAME DECODING METHOD, ENCODER, AND DECODER

CROSS-REFERENCE TO RELATED APPLICATIONS

This application is a continuation of International Patent Application No. PCT/CN2015/096021 filed on Nov. 30, 2015, which claims priority to Chinese Patent Application No. 201510094314.7 filed on Mar. 3, 2015. The disclosures of the aforementioned applications are hereby incorporated by reference in their entireties.

TECHNICAL FIELD

The present application relates to the video encoding and decoding field, and in particular, to an intra-frame encoding method, an intra-frame decoding method, an encoder, and a decoder.

BACKGROUND

Video signals have a very large amount of information, and therefore have a high requirement on transmission network bandwidth or media storage space. Therefore, before a video signal is transmitted, the video signal needs to be compressed in order to save transmission network bandwidth or media storage space. A main purpose of video compression is to minimize picture distortion after compression and reconstruction in a specific bitrate.

Conventional intra-frame encoding usually includes many phases such as prediction, transform, quantization, and entropy encoding. Further, intra-frame prediction is performed on a picture block according to reconstructed reference pixels surrounding the picture block. An intra-frame prediction manner includes 33 types of directional prediction, direct current (DC) prediction, or planar prediction in a video compression standard High Efficiency Video Coding (HEVC), prediction that is based on template matching, or the like. Then, subtraction is performed between original pixel values (original pixel value, that is, original values of pixels in the picture block that is not compressed) of the picture block and predicted pixel values (predicted pixel value, that is, predicted values that are of the pixels in the picture block and that are obtained by means of prediction) to obtain residual values of the entire picture block. The residual values are transformed to obtain transform coefficients. Then, the transform coefficients are quantized to obtain quantized transform coefficients. Finally, prediction mode information and residual value information indicated using the quantized transform coefficients are encoded into a bit-stream using an entropy encoding method.

Correspondingly, video decoding is a process of converting a bit-stream into a video picture. Conventional intra-frame decoding includes main phases such as entropy decoding, prediction, dequantization, and inverse transform. First, the bit-stream is parsed by means of entropy decoding processing to obtain encoding mode information and a quantized transform coefficient. Then, on one hand, predicted pixels are obtained using intra-frame prediction mode information and decoded reconstructed pixels, on the other hand, the quantized transform coefficient is dequantized to obtain a reconstructed transform coefficient, and the reconstructed transform coefficient is reversely transformed to obtain information about a reconstructed residual value. Then, the information about the reconstructed residual value and the predicted pixels are added to obtain reconstructed pixels in order to restore the video picture.

Therefore, an existing encoding method is not flexible enough, and is low in encoding efficiency.

SUMMARY

Embodiments of the present application provide an intra-frame encoding method, an intra-frame decoding method, an encoder, and a decoder. According to the intra-frame encoding method, flexible encoding can be implemented, and encoding efficiency can be improved.

According to a first aspect, an intra-frame encoding method is provided, including obtaining reference pixel values of a current picture block, obtaining a predicted value of a first-type pixel in the current picture block according to the reference pixel values of the current picture block using an intra-frame prediction algorithm, where the current picture block includes the first-type pixel and a second-type pixel, and the second-type pixel is a pixel in the current picture block except the first-type pixel, determining residual values of the first-type pixel according to the predicted value of the first-type pixel and an original pixel value of the first-type pixel, obtaining transform coefficients according to the residual values of the first-type pixel, quantizing the transform coefficients to obtain quantized transform coefficients, reconstructing the first-type pixel according to the quantized transform coefficients and the predicted value of the first-type pixel to obtain a reconstructed value of the first-type pixel, and obtaining a reconstructed value of the second-type pixel according to the reconstructed value of the first-type pixel using an interpolation method.

With reference to the first aspect, in a first possible implementation, before the obtaining a reconstructed value of the second-type pixel according to the reconstructed value of the first-type pixel using an interpolation method, the method further includes determining the interpolation method according to the intra-frame prediction algorithm, where an interpolation manner in the interpolation method is the same as an interpolation manner included in the intra-frame prediction algorithm.

With reference to either the first aspect or the first possible implementation, in a second possible implementation, obtaining the transform coefficients according to the residual values of the first-type pixel includes obtaining residual values of B pixels in the second-type pixel according to the residual values of the first-type pixel, where B is a positive integer that is not less than 1, and transforming the residual values of the first-type pixel and the residual values of the B pixels to obtain the transform coefficients, where a quantity of fixed 0 coefficients in the transform coefficients is equal to B.

With reference to the second possible implementation, in a third possible implementation, a quantity of the residual values of the first-type pixel is A, the B pixels in the second-type pixel correspond to the B residual values, the A residual values are in a one-to-one correspondence with the pixels in the first-type pixel, the B residual values are in a one-to-one correspondence with the B pixels, and obtaining the residual values of B pixels in the second-type pixel according to the residual values of the first-type pixel includes determining a B×A matrix corresponding to the quantity A of the residual values of the first-type pixel and a quantity B of the residual values of the B pixels in the second-type pixel, multiplying the B×A matrix by a column vector that includes the A residual values of the first-type pixel to obtain a column vector that includes the residual values of the B pixels in the second-type pixel, and obtaining the residual values of the B pixels in the second-type pixel according to the column vector that includes the residual values of the B pixels in the second-type pixel.

With reference to either the first aspect or the first possible implementation, in a fourth possible implementation, obtaining the transform coefficients according to the residual values of the first-type pixel includes subtracting a predicted value of each pixel from an original value of each of at least one pixel in the second-type pixel, to obtain a residual value of each pixel, where the predicted value of each pixel is obtained using the intra-frame prediction algorithm, and transforming the residual values of the first-type pixel and a residual value of the at least one pixel in the second-type pixel to obtain the transform coefficients.

With reference to any one of the first aspect, or the first to the fourth possible implementations, in a fifth possible implementation, quantizing the transform coefficients to obtain quantized transform coefficients includes quantizing the transform coefficients in a transform coefficient scanning order to obtain the quantized transform coefficients.

With reference to the fifth possible implementation, in a sixth possible implementation, quantizing the transform coefficients in a transform coefficient scanning order to obtain the quantized transform coefficients includes obtaining the quantized transform coefficients according to the following formula:

$$C'_m = Q(C_m + \Delta_m),$$

where $$\Delta_m = \frac{1}{b_{m,m}} \sum_{j=m+1}^{N} b_{m,j}(C_j - C'_j),$$

and $C_m$ is an $m^{th}$ transform coefficient in the scanning order except the fixed 0 coefficients, $C'_m$ is a quantized transform coefficient of $C_m$, $Q(*)$ is a quantization processing function, $\Delta_m$ is a correction term that depends on a quantization error of a transform coefficient after $C_m$, $b_{m,j}$ is a weighting coefficient that depends on a transform matrix and a location of the first-type pixel in the scanning order, m=1, 2, ..., M, M is a quantity of first-type pixels, and N is a total quantity of first-type pixels and second-type pixels.

With reference to any one of the first aspect, or the first to the sixth possible implementations, in a seventh possible implementation, obtaining the residual values of the first-type pixel according to the predicted value of the first-type pixel and an original pixel value of the first-type pixel includes subtracting the predicted value of the first-type pixel from the original value of the first-type pixel, to obtain the residual values of the first-type pixel.

With reference to any one of the first aspect, or the first to the seventh possible implementations, in an eighth possible implementation, the method further includes generating a bit-stream according to the quantized transform coefficients such that a decoding device reconstructs the current picture block according to the bit-stream.

With reference to the eighth possible implementation, in a ninth possible implementation, generating a bit-stream according to the quantized transform coefficients includes encoding the quantized transform coefficients and information about the intra-frame prediction algorithm using an entropy encoding method to obtain the bit-stream.

With reference to the eighth possible implementation, in a tenth possible implementation, generating a bit-stream according to the quantized transform coefficients includes encoding information about the intra-frame prediction algorithm, the quantized transform coefficients, and information about the interpolation method using an entropy encoding method to obtain the bit-stream.

According to a second aspect, an intra-frame decoding method is provided, including obtaining reference pixel values of a current picture block, obtaining a predicted value of a first-type pixel in the current picture block according to the reference pixel values of the current picture block using an intra-frame prediction algorithm, where the current picture block includes the first-type pixel and a second-type pixel, and the second-type pixel is a pixel in the current picture block except the first-type pixel, dequantizing quantized transform coefficients of the current picture block to obtain transform coefficients, inversely transforming the transform coefficients to obtain reconstructed residual values of the first-type pixel, adding the reconstructed residual values of the first-type pixel and the predicted value of the first-type pixel to obtain a reconstructed value of the first-type pixel, and obtaining a reconstructed value of the second-type pixel according to the reconstructed value of the first-type pixel using an interpolation method.

With reference to the second aspect, in a first possible implementation, before inversely transforming the transform coefficients, the method further includes placing the transform coefficients at first-type preset locations in a transform coefficient matrix in a transform coefficient scanning order, where transform coefficients at second-type preset locations in the transform coefficient matrix are set to preset values, and a sum of a quantity of the second-type preset locations and a quantity of the first-type preset locations is equal to a total quantity of transform coefficients in the transform coefficient matrix.

With reference to the second aspect or the first possible implementation of the second aspect, in a second possible implementation, before obtaining a reconstructed value of the second-type pixel according to the reconstructed value of the first-type pixel using an interpolation method, the method further includes determining the interpolation method according to the intra-frame prediction algorithm, where an interpolation manner in the interpolation method is the same as an interpolation manner included in the intra-frame prediction algorithm.

With reference to the second aspect or the first possible implementation of the second aspect, in a third possible implementation, before obtaining a reconstructed value of the second-type pixel according to the reconstructed value of the first-type pixel using an interpolation method, the method further includes determining the interpolation method according to a bit-stream of the picture block.

According to a third aspect, an encoder is provided, including a first obtaining unit configured to obtain reference pixel values of a current picture block, a second obtaining unit configured to obtain a predicted value of a first-type pixel in the current picture block according to the reference pixel values of the current picture block using an intra-frame prediction algorithm, where the current picture block includes the first-type pixel and a second-type pixel, and the second-type pixel is a pixel in the current picture block except the first-type pixel, a first determining unit configured to obtain residual values of the first-type pixel according to the predicted value of the first-type pixel and an original pixel value of the first-type pixel, a transform unit configured to obtain transform coefficients according to the residual values of the first-type pixel, a quantization unit configured to quantize the transform coefficients to obtain quantized transform coefficients, a first reconstruction unit configured to reconstruct the first-type pixel according to the quantized transform coefficients and the predicted value of the first-type pixel, to obtain a reconstructed value of the first-type pixel, and a second reconstruction unit configured to obtain a reconstructed value of the second-type pixel according to the reconstructed value of the first-type pixel using an interpolation method.

With reference to the third aspect, in a first possible implementation, the encoder further includes a second determining unit configured to determine the interpolation method according to the intra-frame prediction algorithm, where an interpolation manner in the interpolation method is the same as an interpolation manner included in the intra-frame prediction algorithm.

With reference to either the third aspect or the first possible implementation of the third aspect, in a second possible implementation, the transform unit is further configured to obtain residual values of B pixels in the second-type pixel according to the residual values of the first-type pixel, where B is a positive integer that is not less than 1, and transform the residual values of the first-type pixel and the residual values of the B pixels to obtain the transform coefficients, where a quantity of fixed 0 coefficients in the transform coefficients is equal to B.

With reference to the second possible implementation of the third aspect, in a third possible implementation, a quantity of the residual values of the first-type pixel is A, the B pixels in the second-type pixel correspond to the B residual values, the A residual values are in a one-to-one correspondence with the pixels in the first-type pixel, the B residual values are in a one-to-one correspondence with the B pixels, and the third obtaining unit is further configured to determine a B×A matrix corresponding to the quantity A of the residual values of the first-type pixel and a quantity B of the residual values of the B pixels in the second-type pixel, multiply the B×A matrix by a column vector that includes the A residual values of the first-type pixel, to obtain a column vector that includes the residual values of the B pixels in the second-type pixel, and obtain the residual values of the B pixels in the second-type pixel according to the column vector that includes the residual values of the B pixels in the second-type pixel.

With reference to either the third aspect or the first possible implementation of the third aspect, in a fourth possible implementation, the transform unit is further configured to subtract a predicted value of each pixel from an original value of each of at least one pixel in the second-type pixel, to obtain a residual value of each pixel, where the predicted value of each pixel is obtained using the intra-frame prediction algorithm, and transform the residual values of the first-type pixel and a residual value of the at least one pixel in the second-type pixel to obtain the transform coefficients.

With reference to any one of the third aspect, or the first to the fourth possible implementations of the third aspect, in a fifth possible implementation, the quantization unit is further configured to quantize the transform coefficients in a transform coefficient scanning order to obtain the quantized transform coefficients.

With reference to the fifth possible implementation of the third aspect, in a sixth possible implementation, the quantization unit is further configured to obtain the quantized transform coefficients according to the following formula:

$$C'_m = Q(C_m + \Delta_m),$$

where $$\Delta_m = \frac{1}{b_{m,m}} \sum_{j=m+1}^{N} b_{m,j}(C_j - C'_j),$$

and $C_m$ is an $m^{th}$ transform coefficient in the scanning order except the fixed 0 coefficients, $C'_m$ is a quantized transform coefficient of $C_m$, $Q(*)$ is a quantization processing function, $\Delta_m$ is a correction term that depends on a quantization error of a transform coefficient after $C_m$, $b_{m,j}$ is a weighting coefficient that depends on a transform matrix and a location of the first-type pixel in the scanning order, m=1, 2, . . . , M, M is a quantity of first-type pixels, and N is a total quantity of first-type pixels and second-type pixels.

With reference to any one of the third aspect, or the first to the sixth possible implementations of the third aspect, in a seventh possible implementation, the first determining unit is further configured to perform subtraction between the original value of the first-type pixel and the predicted value of the first-type pixel, to obtain the residual values of the first-type pixel.

With reference to any one of the third aspect, or the first to the seventh possible implementations of the third aspect, in an eighth possible implementation, the encoder further includes a generation unit configured to generate a bit-stream according to the quantized transform coefficients such that a decoding device reconstructs the current picture block according to the bit-stream.

With reference to the eighth possible implementation of the third aspect, in a ninth possible implementation, the generation unit is further configured to encode the quantized transform coefficients and information about the intra-frame prediction algorithm using an entropy encoding method, to obtain the bit-stream.

With reference to the eighth possible implementation of the third aspect, in a tenth possible implementation, the generation unit is further configured to encode information about the intra-frame prediction algorithm, the quantized transform coefficients, and information about the interpolation method using an entropy encoding method to obtain the bit-stream.

According to a fourth aspect, a decoder is provided, including a first obtaining unit configured to obtain reference pixel values of a current picture block, a second obtaining unit configured to obtain a predicted value of a first-type pixel in the current picture block according to the reference pixel values of the current picture block using an intra-frame prediction algorithm, where the current picture block includes the first-type pixel and a second-type pixel, and the second-type pixel is a pixel in the current picture block except the first-type pixel, a dequantization unit configured to dequantize quantized transform coefficients of the current picture block to obtain transform coefficients, an inverse transform unit configured to inversely transform the transform coefficients to obtain reconstructed residual values of the first-type pixel, a first reconstruction unit configured to add the reconstructed residual values of the first-type pixel and the predicted value of the first-type pixel to obtain a reconstructed value of the first-type pixel, and a second reconstruction unit configured to obtain a reconstructed value of the second-type pixel according to the reconstructed value of the first-type pixel using an interpolation method.

With reference to the fourth aspect, in a first possible implementation, the decoder further includes a placement unit configured to place the transform coefficients at first-type preset locations in a transform coefficient matrix in a transform coefficient scanning order, where transform coefficients at second-type preset locations in the transform coefficient matrix are set to preset values, and a sum of a quantity of the second-type preset locations and a quantity of the first-type preset locations is equal to a total quantity of transform coefficients in the transform coefficient matrix.

With reference to the fourth aspect or the first possible implementation of the fourth aspect, in a second possible implementation, the decoder further includes a first determining unit configured to determine the interpolation method according to the intra-frame prediction algorithm, where an interpolation manner in the interpolation method is the same as an interpolation manner included in the intra-frame prediction algorithm.

With reference to the fourth aspect or the first possible implementation of the fourth aspect, in a third possible implementation, the decoder further includes a second determining unit configured to determine the interpolation method according to a bit-stream of the picture block.

Based on the foregoing technical solutions, in the embodiments of the present application, transform and quantization processing is performed only on residual values of a first-type pixel to obtain a bit-stream. Residual values of an entire picture block do not need to be all encoded. Therefore, flexible encoding can be implemented, and encoding efficiency can be improved.

BRIEF DESCRIPTION OF DRAWINGS

To describe the technical solutions in the embodiments of the present application more clearly, the following briefly describes the accompanying drawings required for describing the embodiments of the present application. The accompanying drawings in the following description show merely some embodiments of the present application, and a person of ordinary skill in the art may still derive other drawings from these accompanying drawings without creative efforts.

FIGS. 2A, 2B, 2C, 2D, 2E, 2F, 2G and 2H are schematic classification diagrams of first-type pixels and second-type pixels in a 4×4 picture blocks according to an embodiment of the present application;

FIGS. 3A, 3B, 3C, and 3D are schematic classification diagrams of first-type pixels and second-type pixels in an 8×8 picture blocks according to an embodiment of the present application;

FIG. 4 is a schematic diagram of transform according to an embodiment of the present application;

FIGS. 5A, 5B, and 5C are schematic diagrams of scanning orders according to an embodiment of the present application;

DESCRIPTION OF EMBODIMENTS

The following clearly describes the technical solutions in the embodiments of the present application with reference to the accompanying drawings in the embodiments of the present application. The described embodiments are a part rather than all of the embodiments of the present application. All other embodiments obtained by a person of ordinary skill in the art based on the embodiments of the present application without creative efforts shall fall within the protection scope of the present application.

It should be understood that a pixel value in the present application may be a pixel luminance component value, or may be a pixel chrominance component value (for example, either a Cb component value or a Cr component value), or may be one of a red (R) component value, a green (G) component value, or a blue (B) component value. Alternatively, when a pixel is represented using other color space such as Lab (a color model) and hue, saturation, and value, the pixel may be one of the color components. Correspondingly, a transform coefficient and a residual value correspond to the color component.

Figure 1:
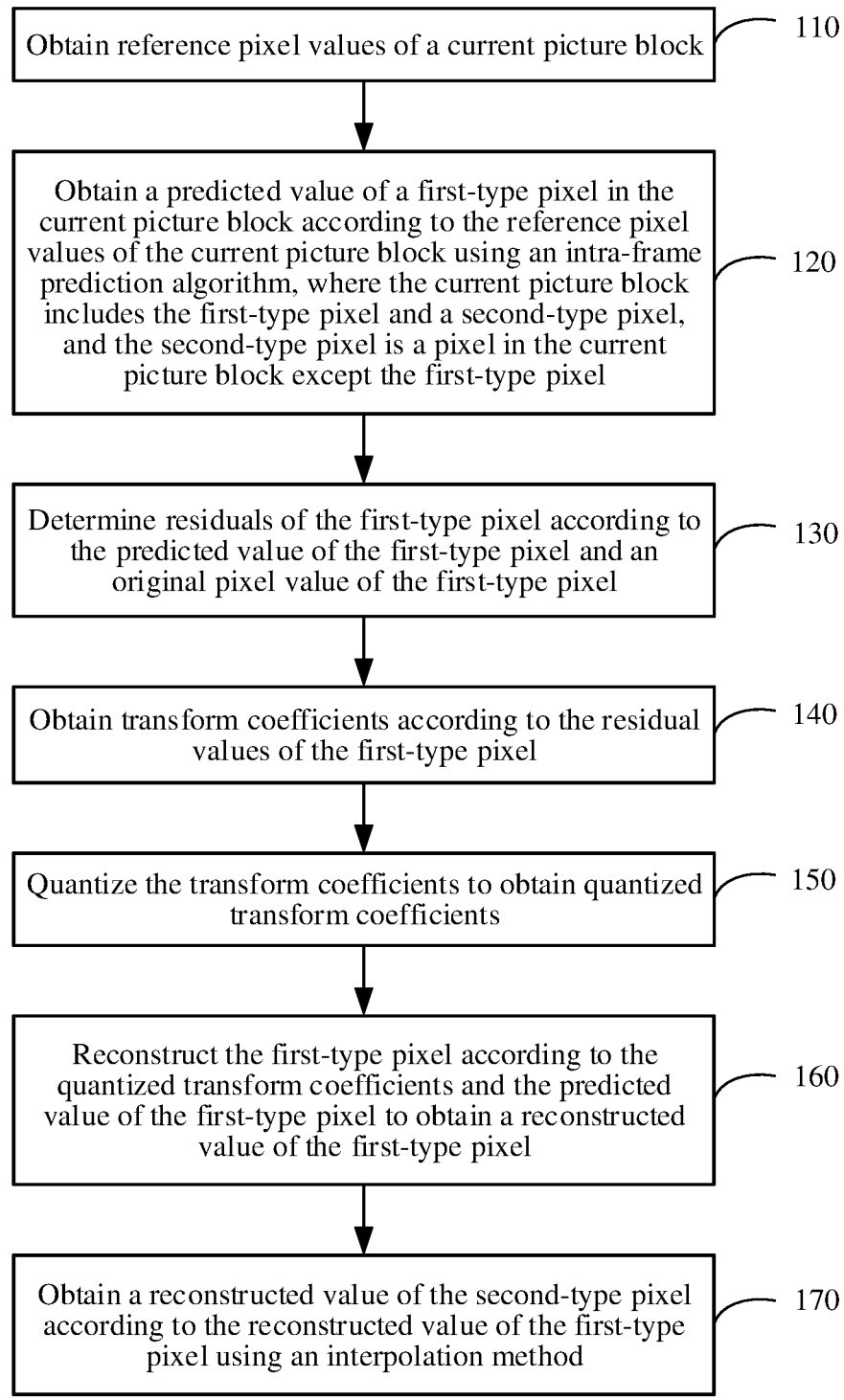
FIG. 1 is a schematic flowchart of an intra-frame encoding method according to an embodiment of the present application.

FIG. 1 is a schematic flowchart of an intra-frame encoding method according to an embodiment of the present application. The method shown in FIG. 1 may be performed by an encoder. Further, the method shown in FIG. 1 includes the following steps.

Step 110: Obtain reference pixel values of a current picture block.

Step 120: Obtain a predicted value of a first-type pixel in the current picture block according to the reference pixel values of the current picture block using an intra-frame prediction algorithm, where the current picture block includes the first-type pixel and a second-type pixel, and the second-type pixel is a pixel in the current picture block except the first-type pixel.

Step 130: Determine residual values of the first-type pixel according to the predicted value of the first-type pixel and an original pixel value of the first-type pixel.

Step 140: Obtain transform coefficients according to the residual values of the first-type pixel.

Step 150: Quantize the transform coefficients to obtain quantized transform coefficients.

Step 160: Reconstruct the first-type pixel according to the quantized transform coefficients and the predicted value of the first-type pixel to obtain a reconstructed value of the first-type pixel.

Step 170: Obtain a reconstructed value of the second-type pixel according to the reconstructed value of the first-type pixel using an interpolation method.

Therefore, in this embodiment of the present application, transform and quantization processing is performed only on residual values of a first-type pixel to obtain a bit-stream. Residual values of an entire picture block do not need to be all encoded. Therefore, flexible encoding can be implemented, and encoding efficiency can be improved.

Further, in this embodiment of the present application, the first-type pixel is reconstructed according to quantized transform coefficients and a predicted value of the first-type pixel (one part of pixels) to obtain a reconstructed value of the first-type pixel. In addition, a second-type pixel (the other part of pixels) is directly reconstructed using an interpolation method that is based on the reconstructed part of pixels. By means of the method for classifying a code block into two types of pixels and separately encoding and reconstructing the two types of pixels in different manners, a bitrate can be reduced, and encoding efficiency can be improved.

It should be understood that the current picture block may be any one or one type of picture block in a current frame. The picture block in this embodiment of the present application may be in multiple sizes, for example, may be in a size of 3×3, 4×4, 8×8, 16×16, 32×32, 64×64, 8×4, 4×8, 16×12, or 9×9. This embodiment of the present application is not limited thereto.

It should be noted that pixels in the current picture block include two types of pixels the first-type pixel and the second-type pixel. A first-type pixel may be a pixel at any location in the current picture block. For example, the first-type pixel may be at a location such as a right boundary, a lower boundary, a center, an upper-right to lower-left diagonal, an upper-left to lower-right diagonal, or the like in the current picture block. A quantity of first-type pixels is greater than 0 and is less than a quantity of pixels in the entire current picture block. For example, the quantity of first-type pixels is ½, 7/16, 15/32, ¾, ¼, or the like of the quantity of pixels in the entire current picture block. The second-type pixel is a pixel in the picture block except the first-type pixel.

FIGS. 2A-2H are classification examples of first-type pixels and second-type pixels in a 4×4 picture block according to an embodiment of the present application. Eight examples are given in FIG. 2A to FIG. 2H. A classification case of first-type pixels and second-type pixels in FIG. 2A may be used.

It should be understood that classification of a first-type pixel and a second-type pixel in a larger picture block may be considered as a combination of multiple small picture blocks. For example, pixel classification of an 8×8 picture block or a larger picture block may be a combination of pixel classification of four or more picture blocks each with a size that is smaller than a size of the picture block. For example, pixel classification of an 8×8 block in an example in FIG. 3A is obtained by repeatedly using the pixel classification of the 4×4 block in an example in FIG. 2A, that is, pixel classification of each of four 4×4 blocks in the 8×8 block is performed using the pixel classification method of the 4×4 block in the example in FIG. 2A. Alternatively, pixel classification of an 8×8 block or a larger block may be performed in another manner, for example, in a pixel classification manner in FIG. 2B, FIG. 2C, or FIG. 2D. Same pixel classification may be used for all intra-frame prediction modes, or different pixel classification may be used for each intra-frame prediction mode, or same pixel classification may be used for several intra-frame prediction modes. For brief description, an example of using the pixel classification method in FIG. 2A for a 4×4 picture block is mainly used in the following embodiment to describe a specific processing method.

It should be understood that in step 120, the intra-frame prediction algorithm may include directional prediction, DC prediction, or planar prediction in H.265/HEVC or H.264/advanced video coding (AVC), or may be intra-frame prediction that is based on template matching, or the like. This is not limited in this embodiment of the present application.

It should be understood that when the predicted value of the first-type pixel is generated using the intra-frame prediction algorithm, a predicted value of the second-type pixel may be further generated.

It should be further understood that according to this embodiment of the present application, a decoder and an encoder may be a same device, or a decoder and an encoder may be different devices. This is not limited in this embodiment of the present application.

Optionally, in another embodiment, in step 130, the predicted value of the first-type pixel may be subtracted from the original value of the first-type pixel to obtain the residual values of the first-type pixel, or the original value of the first-type pixel may be subtracted from the predicted value of the first-type pixel to obtain the residual values of the first-type pixel. The residual values that are of the first-type pixel and that are obtained in the first manner and the residual values that are of the first-type pixel and that are obtained in the second manner are opposite numbers. In an example of this embodiment, the residual values of the first-type pixel may be obtained in the first manner.

It should be understood that in the first manner, a first residual value in the residual values of the first-type pixel is a difference between an original value and a predicted value of a first pixel. In other words, each of the residual values of the first-type pixel is a difference between an original value and a predicted value of a same first-type pixel.

Similarly, subtraction may be performed between an original value of the second-type pixel and the predicted value of the second-type pixel to obtain residual values of the second-type pixel.

In step 140, the residual values of the first-type pixel may be transformed in multiple forms. For example, one-dimensional transform may be performed, or two-dimensional transform may be performed. The two-dimensional transform may be two-dimensional discrete cosine transform (DCT), two-dimensional discrete sine transform (DST), or the like. This embodiment of the present application is not limited thereto.

For example, a square may be transformed using the following formula:

$$C = H \cdot E \cdot H^T.$$

Herein, C is a transform coefficient matrix that includes multiple transform coefficients, E is a residual value matrix. The residual value matrix includes at least the residual values of all the first-type pixels, and may further include a residual value of at least one second-type pixel, H is a transform matrix, $H^T$ is a transposed matrix of the transform matrix H. For example, when H is a 4×4 DST transform matrix, $$H = \begin{bmatrix} 29 & 55 & 74 & 84 \\ 74 & 74 & 0 & -74 \\ 84 & -29 & -74 & 55 \\ 55 & -84 & 74 & -29 \end{bmatrix} \Big/ 128.$$

For another example, when H is an 8×8 DCT matrix, a DCT matrix specified in the HEVC standard may be used.

It should be understood that a quantity of non-0 transform coefficients in the transform coefficients is less than or equal to the quantity of first-type pixels.

In step 150, the transform coefficients may be quantized in multiple manners. For example, in one method, the transform coefficient may be divided by a quantization step, and rounding is performed on a value obtained after the division. This is referred to as common quantization processing. In another method, quantization may be performed using a rate-distortion optimized quantization (RDOQ) method. This embodiment of the present application is not limited thereto.

Optionally, in another embodiment, in step 160, the quantized transform coefficients are dequantized to obtain reconstructed transform coefficients, the reconstructed transform coefficients are inversely transformed to obtain reconstructed residual values of the first-type pixel, and the reconstructed residual values of the first-type pixel and the predicted value of the first-type pixel are added to obtain the reconstructed value of the first-type pixel.

It should be understood that dequantization processing may be multiplying the quantized transform coefficients by the quantization step to obtain the reconstructed transform coefficients. The operation of multiplying the quantized transform coefficients by the quantization step may be usually completed by means of integer multiplication and shift. For example, a dequantization process in H.265/HEVC is as follows:

$$R(i) = \text{sign}\{Q(i)\} \cdot (Q(i) \cdot Qs'(i) + (1 << (bdshift - 1))) >> bdshift.$$

Herein, sign $\{X\}$ means obtaining a sign of X, $Q(i)$ is an $i^{th}$ quantized transform coefficient, $R(i)$ is a reconstructed transform coefficient, bdshift is a shift parameter, $Qs'(i)$ is an integer, and $Qs'(i)/2^{bdshift}$ is approximately the quantization step. $Qs'(i)$ depends on both a level scale and a scaling factor.

The transform coefficients are obtained after the dequantization. The transform coefficients may be placed at first-type preset locations in a transform coefficient matrix in a scanning order. Transform coefficients at second-type preset locations in the transform coefficient matrix are set to preset values. A quantity of the second-type preset locations is greater than or equal to 0 and is less than a total quantity of transform coefficients in the transform coefficient matrix. For example, the preset value may be 0. The transform coefficient matrix is divided into the two parts, the first-type preset locations and the second-type preset locations. Further, the scanning order may include vertical scanning, horizontal scanning, or diagonal scanning. For example, three scanning orders shown in FIGS. 5A-5C are respectively the vertical scanning in FIG. 5A, the horizontal scanning in FIG. 5B, or the diagonal scanning in FIG. 5C.

In this embodiment of the present application, there are multiple inverse transform forms. For example, two-dimensional discrete transform such as inverse DCT transform or inverse DST transform may be used. When a square is transformed, inverse transform processing is shown in the following formula:

$$\text{E} = H^T \cdot \hat{C} \cdot H.$$

Herein, $\hat{C}$ is a transform coefficient matrix that is reconstructed after dequantization and includes multiple reconstructed transform coefficients, $\hat{\text{E}}$ is a reconstructed residual value matrix that includes multiple reconstructed residual values, H is a transform matrix, and $H^T$ is a transposed matrix of the transform matrix H. Residual values obtained after inverse transform include at least the residual values of all the first-type pixels, and may further include a residual value of at least one second-type pixel. An inverse transform size may be the same as a size of a picture block. In this case, a quantity of residual values generated using inverse transform is equal to a quantity of pixels in the picture block. The two-dimensional discrete transform such as the two-dimensional DST and the two-dimensional DCT meets that a size of a transform matrix is equal to a size of a picture block. Alternatively, an inverse transform size may be smaller than a size of a picture block. For example, a 3×3 block in the lower right corner of a 4×4 block in an example in FIG. 2F includes all the first-type pixels. In this case, reconstructed transform coefficients are inversely transformed using 3×3 inverse transform to obtain residual values of the 3×3 block. For another example, 4×4 inverse transform may be separately used for the four 4×4 blocks in the 8×8 block in the example in FIG. 3A to obtain residual values of the four 4×4 blocks. Both residual values of a first-type pixel in a picture block and residual values of a second-type pixel in the picture block may be generated using inverse transform. To reduce calculation, only the residual values of the first-type pixel may be generated while the residual values of the second-type pixel are not generated.

It should be understood that a reconstructed value obtained by adding a residual value and a predicted value may exceed a dynamic range of a pixel. For example, a dynamic range of an 8-bit pixel is 0 to 255. Therefore, in this embodiment of the present application, when a predicted value obtained by adding a residual value and a predicted value exceeds an upper limit or a lower limit of a dynamic range of a pixel, the predicted value is set to a maximum value or a minimum value of the dynamic range, for example, set to 255 or 0.

Figure 6:
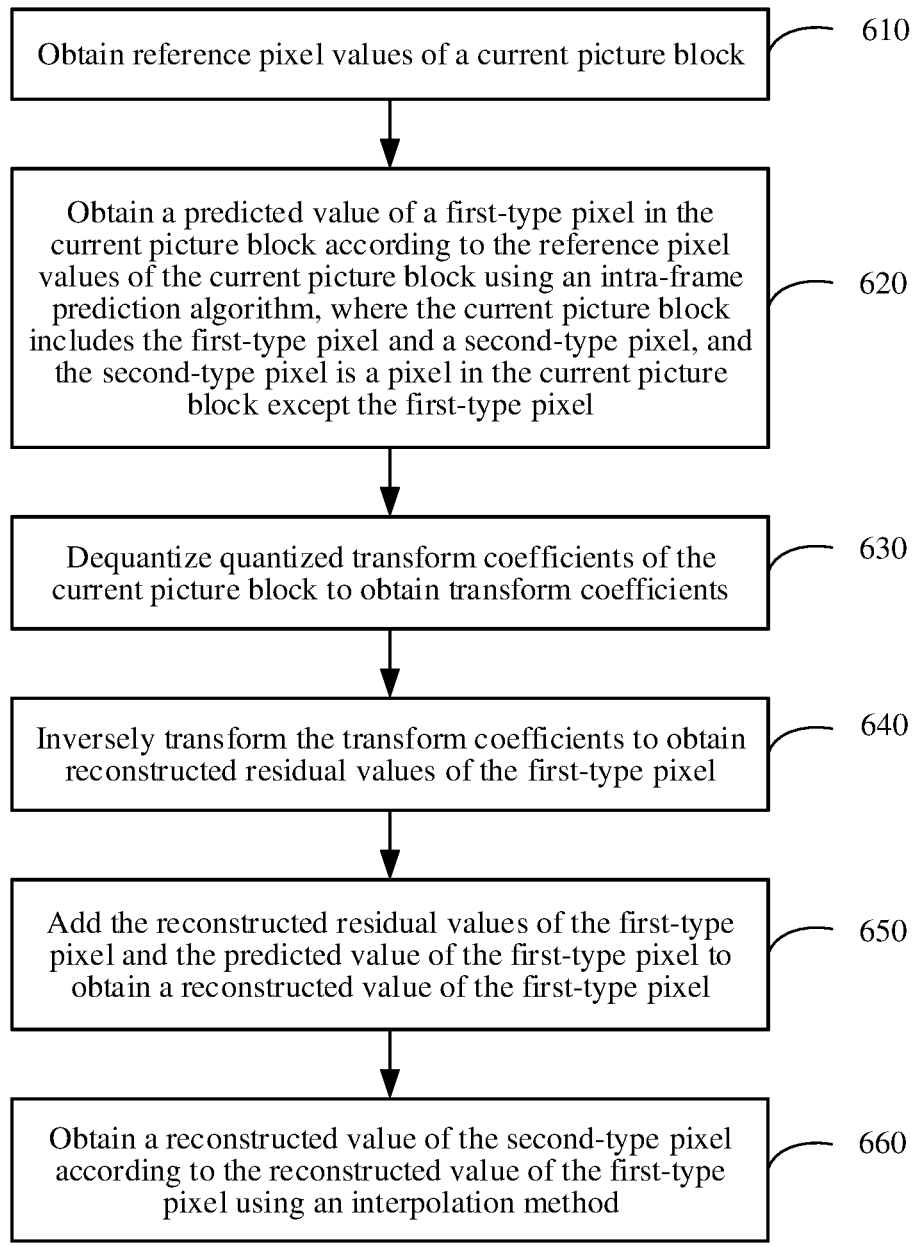
FIG. 6 is a schematic flowchart of an intra-frame decoding method according to an embodiment of the present application.

It should be noted that a process of reconstructing the first-type pixel may be the same as the process of reconstructing the first-type pixel in the decoding method shown in FIG. 6. For a specific process of reconstructing the first-type pixel in this embodiment of the present application, refer to the process of reconstructing the first-type pixel in the decoding method shown in FIG. 6. To avoid repetition, details are not described herein.

Optionally, in another embodiment, before step 170, the method in this embodiment of the present application further includes determining the interpolation method according to the intra-frame prediction algorithm, where an interpolation manner in the interpolation method is the same as an interpolation manner included in the intra-frame prediction algorithm.

In other words, the interpolation method may be determined using the intra-frame prediction algorithm in step 120. The reconstructed value of the second-type pixel may be further obtained according to reference pixels of the picture block and/or the reconstructed value of the first-type pixel using the interpolation method.

Further, there are multiple interpolation methods. The following describes several methods for reconstructing the second-type pixel.

Method 1 is an interpolation method that is based on an average value of surrounding pixels. Surrounding reference pixels of the second-type pixel and/or the reconstructed first-type pixel are obtained. Weighted averaging is performed on the pixels to obtain the reconstructed value of the second-type pixel by means of interpolation. For example, a pixel $P_{1,1}$ that belongs to the second-type pixel may be obtained by performing weighted averaging on reference pixels $R_{0,0}$, $R_{0,1}$, $R_{0,2}$, $R_{1,0}$, and $R_{2,0}$ surrounding $P_{1,1}$ and a reconstructed first-type pixel $R_{2,2}$. A weighted averaging method that can be used may be shown in one of the following formulas:

$$P_{1,1} = (R_{0,0} + R_{2,2} + R_{0,2} + R_{2,0})/4,$$

$$P_{1,1} = (R_{0,1} \times 1.5 + R_{1,0} \times 1.5 + R_{0,0} + R_{2,2} + R_{0,2} + R_{2,0})/7, \text{ or}$$

$$P_{1,1} = (R_{0,1} \times 2 + R_{1,0} \times 2 + R_{0,0} + R_{2,2} + R_{0,2} + R_{2,0} + 4)/>>3.$$

It should be noted that because a pixel value is usually an integer, a rounding operation may further need to be performed on a weighted average value.

Method 2 is a direction-based interpolation method. According to a predetermined interpolation direction, reference pixels of the second-type pixel in this direction and/or the reconstructed first-type pixel are obtained, and the reconstructed value of the second-type pixel are obtained using an interpolation filter. For example, when the interpolation direction is a vertical (vertical downward) direction, a pixel $P_{1,2}$ that belongs to the second-type pixel may be obtained according to $R_{0,2}$ and $R_{2,2}$ using a linear interpolation filter, for example, $P_{1,2}=(2R_{0,2}+2R_{2,2}+2)>>2$, or $P_{1,2}$ is obtained according to $R_{0,2}$, $R_{2,2}$, and $R_{4,2}$ using a three-tap filter, for example, $P_{1,2}=(5R_{0,2}-R_{2,2}+4R_{4,2})>>3$, or may be obtained according to $R_{0,1}$, $R_{0,2}$, $R_{0,3}$, $R_{2,2}$, $R_{4,1}$, $R_{4,2}$, and $R_{4,3}$ using a seven-tap filter, for example, $P_{1,2}=(2R_{0,1}+4R_{0,2}+2R_{0,3}+5R_{2,2}-2R_{4,1}+R_{4,2}-2R_{4,3})/10$.

Method 3 is a hybrid interpolation method. Reference pixels surrounding second-type pixel at a predetermined location and/or the reconstructed first-type pixel is obtained. A reconstructed value of the second-type pixel is obtained by means of linear interpolation. Then, for a second-type pixel at another location, according to a predetermined direction, reference pixels of the second-type pixel in the direction and/or the reconstructed first-type pixel, and the reconstructed second-type pixel are obtained. A reconstructed value of the second-type pixel is obtained using an interpolation filter.

Method 4 is a transform-based interpolation method. A locations of the second-type pixel is padded with a preset value, such as 0 or 128. A pixel block that includes reference pixels, the reconstructed first-type pixel, and a padded second-type pixel is transformed. Inverse transform is performed after transform coefficients at preset locations in the transform coefficients are removed to obtain the reconstructed value of the second-type pixel.

In Method 5, an intra-frame prediction mode in HEVC is used as the interpolation method for the second-type pixel. In this case, an intra-frame prediction mode for the first-type pixel may be the same as or may be different from the intra-frame prediction mode for the second-type pixel.

It should be understood that the second-type pixel may be reconstructed using one of the foregoing methods, or the second-type pixel may be reconstructed using a combination of several foregoing methods. This is not limited in this embodiment of the present application.

Optionally, in another embodiment, in step 140, residual values of B pixels in the second-type pixel are obtained according to the residual values of the first-type pixel, where B is a positive integer that is not less than 1.

The residual values of the first-type pixel and the residual values of the B pixels are transformed to obtain the transform coefficients. A quantity of fixed 0 coefficients in the transform coefficients is equal to B.

It should be understood that only the residual values of all the first-type pixel may be transformed above. For example, when the first-type pixel is a small square block in the current picture block, only the residual values of all the first-type pixels may be transformed. For example, all the first-type pixels are a 4×4 block in a current 8×8 picture block. Alternatively, the residual values of all the first-type pixels and a residual value of at least one (B) second-type pixel may be transformed. In this case, a transform size may be the same as a size of the picture block, that is, a quantity of residual values for transforming is equal to a quantity of pixels in the picture block, or a transform size may be smaller than a size of the picture block. Particularly, for the two-dimensional discrete transform such as the two-dimensional DST and the two-dimensional DCT, when the picture block is a square, and when a size of a transform matrix is equal to a size of the picture block, the residual values of all the first-type pixels and the residual values of all the second-type pixels are included in a transform unit. When a transform size is smaller than a size of the picture block, the residual values of all the first-type pixels and residual values of some second-type pixels are included in a transform unit. For example, the 3×3 block in the lower right corner of the 4×4 block in the example in FIG. 2F includes all the first-type pixels. In this case, only the residual values of the 3×3 block may be transformed. For another example, 4×4 transform may be separately used for the four 4×4 blocks in the 8×8 block in the example in FIG. 3A.

In another embodiment, a quantity of the residual values of the first-type pixel is A. The B pixels in the second-type pixel correspond to the B residual values. The A residual values are in a one-to-one correspondence with the pixels in the first-type pixel, and the B residual values are in a one-to-one correspondence with the B pixels. Obtaining the residual values of the B pixels in the second-type pixel according to the residual values of the first-type pixel includes determining a B×A matrix corresponding to the quantity A of the residual values of the first-type pixel and a quantity B of the residual values of the B pixels in the second-type pixel, multiplying the B×A matrix by a column vector that includes the A residual values of the first-type pixel to obtain a column vector that includes the residual values of the B pixels in the second-type pixel, and obtaining the residual values of the B pixels in the second-type pixel according to the column vector that includes the residual values of the B pixels in the second-type pixel.

A smart padding method is elaborated in the document "A new padding technique for coding of arbitrarily-shaped image/video segments" (International Conference on Image Processing (ICIP) 1999). That is, according to a vector (column vector) that includes A known pixel values (residual values of a first-type pixel), a derived B×A matrix is multiplied by the vector (column vector) to obtain a column vector that includes other B pixel values (residual values of a second-type pixel) and then obtain the B pixel values. Coefficients at B fixed locations in transform coefficients obtained after DCT transform is performed on the A+B pixel values are always 0 (or are approximately 0 because of inadequate operation precision). The B coefficients are briefly referred to as fixed 0 coefficients. By means of the method, some of transform coefficients of residual values of a picture block may be fixed 0 coefficients in order to reduce a quantity of non-0 coefficients that need to be encoded.

Using the smart padding method, a weighted average of the residual values of the first-type pixel is used as a residual value of at least one second-type pixel such that transform coefficients obtained after generated residual values are transformed may have multiple fixed 0 coefficients. A quantity of fixed 0 coefficients is equal to or greater than the quantity B of second-type pixels for which the residual values are generated in order to reduce non-0 coefficients that need to be encoded. The fixed 0 coefficient may be set at any location in the transform coefficient matrix. This is not limited in this embodiment of the present application. In an example of this embodiment, the fixed 0 coefficient may be set at a high-frequency coefficient location in the transform coefficient matrix, such as a coefficient location in the lower right corner, or may be set at a rearward coefficient location in a coefficient scanning sequence.

For example, according to the pixel classification method in the example in FIG. 2A, residual values (such as $p_{11}$, $p_{12}$, . . . , $p_{33}$ in FIG. 4) of all eight second-type pixels are obtained using residual values (such as $x_{14}, x_{22}, \ldots, x_{44}$ in FIG. 4) of eight first-type pixels. In this process, a vector that includes the residual values of the first-type pixels is multiplied by an 8×8 matrix on the left to obtain the residual values of the second-type pixels. This is shown in the following formula:

$$\begin{bmatrix} p_{11} \\ p_{12} \\ p_{13} \\ p_{21} \\ p_{23} \\ p_{31} \\ p_{32} \\ p_{33} \end{bmatrix} = \begin{bmatrix} 0.6609 & 0.3452 & 0.4327 & 0 & 0.3452 & 0.4327 & 0 & 0.1641 \\ 0.8129 & 0.6548 & 0.5323 & 0 & 0 & 0.1871 & 0 & 0.1225 \\ 0.4328 & 0.8810 & 0.2834 & 0 & 0 & 0.2834 & 0.3452 & 0.1186 \\ 0.8129 & 0 & 0.1871 & 0 & 0.6548 & 0.5323 & 0 & 0.1225 \\ 0.5324 & 0 & 0.5324 & 0 & 0 & 0.3486 & 0.6548 & 0.3486 \\ 0.4328 & 0 & 0.2834 & 0.3452 & 0.8810 & 0.2834 & 0 & 0.1186 \\ 0.5324 & 0 & 0.3486 & 0.6548 & 0 & 0.5324 & 0 & 0.3486 \\ 0.2834 & 0 & 0.1856 & 0.8810 & 0 & 0.1856 & 0.8810 & 0.5646 \end{bmatrix} \begin{bmatrix} x_{22} \\ x_{14} \\ x_{24} \\ x_{34} \\ x_{41} \\ x_{42} \\ x_{43} \\ x_{44} \end{bmatrix}.$$

After two-dimensional 4×4 DST transform is performed, a corresponding 4×4 transform coefficient matrix may have eight fixed 0 coefficients (such as eight coefficients in FIG. 4 except $y_{14}, y_{12}, \ldots, y_{41}$). A calculation manner of an 8×8 matrix can be obtained using the smart padding method. For another example, the 3×3 block at the lower right of the 4×4 block in the example in FIG. 2F includes all the first-type pixels. In this case, only the residual values of the first-type pixels in the 3×3 block may be obtained using the smart padding method. It should be noted that in subsequent processing, the residual values of the lower-right 3×3 block may be transformed and quantized using 3×3 transform.

Alternatively, in another embodiment, in step 140, a predicted value of each pixel is subtracted from an original value of each of at least one pixel in the second-type pixel, to obtain a residual value of each pixel. The predicted value of each pixel is obtained using the intra-frame prediction algorithm. The residual values of the first-type pixel and a residual value of the at least one pixel in the second-type pixel are transformed to obtain the transform coefficients.

In other words, each residual value of the at least one pixel in the second-type pixel is a difference between an original value and a predicted value of a same second-type pixel.

Optionally, in another embodiment, in step 150, the transform coefficients are quantized in a transform coefficient scanning order to obtain the quantized transform coefficients.

The transform coefficients are quantized to obtain the quantized transform coefficients. A quantization method is usually scalar quantization, or may be vector quantization or another manner. A smart quantization method elaborated in the document "Constrained Quantization in the Transform Domain with Applications in Arbitrarily-Shaped Object Coding" (Institute of Electrical and Electronics Engineers (IEEE) Transactions on Circuits and Systems for Video Technology (TCSVT), vol. 20, No. 11, 2010) may be used. Quantized transform coefficients are sequentially determined from back to front in a transform coefficient scanning order in order to minimize distortion of a reconstructed residual value of a target pixel point in a code block.

In this embodiment of the present application, the quantized transform coefficients are sequentially determined from back to front in the transform coefficient scanning order in order to minimize distortion of the reconstructed residual values of the first-type pixel.

In another embodiment, in step 150, the quantized transform coefficients are obtained according to the following formula:

$$C'_m = Q(C_m + \Delta_m),$$

where $$\Delta_m = \frac{1}{b_{m,m}} \sum_{j=m+1}^{N} b_{m,j}(C_j - C'_j),$$

and $C_m$ is an $m^{th}$ transform coefficient in the scanning order except the fixed 0 coefficients, $C''_m$ is a quantized transform coefficient of $C_m$, $Q(*)$ is a quantization processing function, $\Delta_m$ is a correction term that depends on a quantization error of a transform coefficient after $C_m$ in the scanning order, and is a weighted average value of quantization errors of transform coefficients after the quantized transform coefficient $C_m$ in the scanning order, $b_{m,j}$ is a weighting coefficient, a value of $b_{m,j}$ depends on a transform matrix and a location of the first-type pixel in the scanning order, m=1, 2, . . . , M, M is a quantity of first-type pixels, and N is a total quantity of first-type pixels and second-type pixels.

Further, in another embodiment, the transform coefficient scanning order includes vertical scanning, horizontal scanning, or diagonal scanning.

For example, a transform coefficient matrix in FIG. 4 that is obtained after the residual values generated using the smart padding method are transformed is scanned in three scanning orders in FIGS. 5A-5C, the vertical scanning in FIG. 5A, the horizontal scanning in FIG. 5B, and the diagonal scanning in FIG. 5C. In the three scanning orders, three B matrices $B_{ver}$, $B_{hor}$, and $B_{diag}$ that are formed by component $b_{m,n}$ (m=1, 2, . . . , M, and n=1, 2, . . . , N) are as follows. It should be noted that in this case, there are fixed 0 coefficients in the scanning order, and therefore, the fixed 0 coefficients are not included in an arrangement order of $C_m$. For example, a coefficient $C_{1,3}$ in the first row and the third column is the ninth coefficient in the vertical scanning order. However, because $C_{3,2}$ and $C_{3,3}$ are fixed 0 coefficients, an actual sequence number of $C_{1,3}$ is 7, that is, $C_{1,3}$ is $C_7$. Similarly, $C_{1,4}$ is $C_8$.

$$B_{ver} = \begin{vmatrix} 0.8430 & -0.2022 & 0.1689 & -0.1619 & -0.2022 & -0.0975 & 0.1689 & -0.1619 & 0.0986 & 0.0986 & -0.0837 & 0.0828 & -0.1504 & -0.1504 & 0.0828 & 0.0678 \\ 0 & 0.8020 & -0.1642 & -0.0350 & -0.1535 & -0.2373 & 0.1463 & -0.1989 & -0.1332 & 0.2189 & 0.0824 & 0.0207 & -0.0935 & -0.2790 & 0.0206 & 0.1749 \\ 0 & 0 & 0.7002 & -0.0098 & 0.1315 & -0.1072 & -0.1072 & 0.0921 & -0.4791 & 0.1461 & 0.3608 & 0.0032 & 0.0149 & -0.0294 & -0.2089 & -0.0558 \\ 0 & 0 & 0 & 0.7157 & -0.2286 & -0.0988 & 0.1414 & 0.0348 & 0.0097 & 0.0348 & 0.0079 & 0.3352 & -0.3922 & 0.1288 & -0.0619 & -0.3437 \\ 0 & 0 & 0 & 0 & 0.7417 & -0.2984 & -0.0847 & -0.0847 & 0.2971 & -0.1139 & 0.0446 & 0.1293 & -0.4445 & -0.1139 & 0.0446 & 0.1293 \\ 0 & 0 & 0 & 0 & 0 & 0.6784 & -0.1618 & -0.1618 & -0.3602 & -0.2177 & 0.0853 & -0.2471 & -0.3602 & -0.2177 & 0.0853 & 0.2471 \\ 0 & 0 & 0 & 0 & 0 & 0 & 0.6565 & -0.0006 & 0.0000 & -0.5784 & 0.4299 & -0.2267 & 0.0000 & 0.0005 & -0.0004 & 0.0002 \\ 0 & 0 & 0 & 0 & 0 & 0 & 0 & 0.6565 & 0.0000 & 0.0000 & 0.0000 & 0.0000 & 0.0000 & -0.5784 & 0.4299 & -0.2267 \end{vmatrix}$$

$$B_{hor} = \begin{vmatrix} 0.8430 & -0.2022 & 0.1689 & -0.1619 & -0.2022 & -0.0975 & 0.1689 & -0.1619 & 0.0986 & 0.0986 & -0.0837 & 0.0828 & -0.1504 & -0.1504 & 0.0828 & 0.0678 \\ 0 & 0.8020 & -0.1642 & -0.0350 & -0.1535 & -0.2373 & 0.1463 & -0.1989 & -0.1332 & 0.2189 & 0.0824 & 0.0207 & -0.0935 & -0.2790 & 0.0206 & 0.1749 \\ 0 & 0 & 0.7002 & -0.0098 & 0.1315 & -0.1072 & -0.1072 & 0.0921 & -0.4791 & 0.1461 & 0.3608 & 0.0032 & 0.0149 & -0.0294 & -0.2089 & -0.0558 \\ 0 & 0 & 0 & 0.7157 & -0.2286 & -0.0988 & 0.1414 & 0.0348 & 0.0097 & 0.0348 & 0.0079 & 0.3352 & -0.3922 & 0.1288 & -0.0619 & -0.3437 \\ 0 & 0 & 0 & 0 & 0.7417 & -0.2984 & -0.0847 & -0.0847 & 0.2971 & -0.1139 & 0.0446 & 0.1293 & -0.4445 & -0.1139 & 0.0446 & 0.1293 \\ 0 & 0 & 0 & 0 & 0 & 0.6784 & -0.1618 & -0.1618 & -0.3602 & -0.2177 & 0.0853 & -0.2471 & -0.3602 & -0.2177 & 0.0853 & 0.2471 \\ 0 & 0 & 0 & 0 & 0 & 0 & 0.6565 & -0.0006 & 0.0000 & -0.5784 & 0.4299 & -0.2267 & 0.0000 & 0.0005 & -0.0004 & 0.0002 \\ 0 & 0 & 0 & 0 & 0 & 0 & 0 & 0.6565 & 0.0000 & 0.0000 & 0.0000 & 0.0000 & 0.0000 & -0.5784 & 0.4299 & -0.2267 \end{vmatrix}$$

$$B_{diag} = \begin{vmatrix} 0.8430 & -0.2022 & -0.2022 & 0.1689 & -0.0975 & 0.1689 & -0.1619 & -0.1619 & 0.0986 & 0.0986 & -0.1504 & 0.0828 & -0.1504 & 0.0828 & 0.0828 & 0.0678 \\ 0 & 0.8020 & -0.1535 & -0.1642 & -0.2373 & 0.1463 & -0.0350 & -0.1989 & 0.2189 & -0.1332 & -0.0935 & 0.0207 & -0.2790 & 0.0207 & 0.0206 & 0.1749 \\ 0 & 0 & 0.7872 & 0.1170 & -0.2880 & -0.1387 & -0.2095 & -0.0745 & -0.0930 & 0.1971 & -0.3025 & 0.1000 & -0.1496 & 0.0250 & 0.0251 & 0.2123 \\ 0 & 0 & 0 & 0.6904 & -0.1674 & -0.0852 & 0.0256 & 0.1060 & 0.1640 & -0.5193 & 0.0663 & 0.3490 & -0.0045 & -0.0010 & -0.2161 & -0.0926 \\ 0 & 0 & 0 & 0 & 0.7025 & -0.1848 & -0.1775 & -0.1584 & -0.2101 & -0.3729 & -0.2165 & 0.0770 & -0.2334 & 0.1456 & 0.0943 & 0.3140 \\ 0 & 0 & 0 & 0 & 0 & 0.6597 & 0.0645 & -0.0039 & -0.5811 & 0.0000 & -0.0568 & 0.4319 & 0.0034 & -0.1855 & -0.0026 & -0.0209 \\ 0 & 0 & 0 & 0 & 0 & 0 & 0.6574 & -0.0338 & 0.0000 & 0.0000 & -0.5791 & 0.0000 & 0.0298 & 0.4304 & -0.0221 & -0.2153 \\ 0 & 0 & 0 & 0 & 0 & 0 & 0 & 0.6565 & 0.0000 & 0.0000 & 0.0000 & 0.0000 & -0.5784 & 0.0000 & 0.4299 & -0.2267 \end{vmatrix}$$

It should be noted that the two methods for obtaining the residual values and the three methods for obtaining the quantized transform coefficients may be used in a combination of two methods. When residual value processing that is based on the smart padding method and a quantization technology that is based on the smart quantization method are jointly used, relatively high encoding efficiency is achieved. In addition, when the smart padding method is used, transform coefficients may have fixed 0 coefficients, and the fixed 0 coefficients each may be located between two non-0 coefficients in a scanning sequence. When the transform coefficients are encoded, scanning of 0 coefficients at fixed locations may be skipped.

Optionally, in another embodiment, after step 150, the method in this embodiment of the present application further includes generating a bit-stream according to the quantized transform coefficients such that a decoding device reconstructs the current picture block according to the bit-stream.

In another embodiment, generating a bit-stream according to the quantized transform coefficients includes encoding the quantized transform coefficients and information about the intra-frame prediction algorithm using an entropy encoding method, to obtain the bit-stream. The information about the intra-frame prediction algorithm may be intra-frame prediction mode information or the like.

Alternatively, in another embodiment, generating a bit-stream according to the quantized transform coefficients encoding information about the intra-frame prediction algorithm, the quantized transform coefficients, and information about the interpolation method using an entropy encoding method to obtain the bit-stream.

In other words, the information about the interpolation method may be explicitly transmitted in the bit-stream. Alternatively, a preset interpolation manner for the second-type pixel may be implicitly mapped according to the intra-frame prediction mode for the first-type pixel. In this case, the information about the interpolation method does not need to be transmitted in the bit-stream. For example, when the intra-frame prediction mode for the first-type pixel is the DC mode, the interpolation manner for the second-type pixel is the method that is based on an average value of surrounding pixels. When the intra-frame prediction mode for the first-type pixel is the directional prediction, the interpolation manner for the second-type pixel is the directional interpolation that is based on a same direction. Alternatively, a corresponding preset interpolation manners for the second-type pixel may be used by default for several intra-frame prediction modes for the first-type pixel, and for the remaining intra-frame prediction modes for the first-type pixel, the information about the interpolation method for the second-type pixel is transmitted in the bit-stream.

The intra-frame encoding method in the present application may be used as a supplement to a conventional intra-frame encoding method. For example, the intra-frame encoding method in the present application is added in addition to 35 intra-frame prediction encoding modes in HEVC. Alternatively, the intra-frame encoding method in the present application may be used to replace a conventional intra-frame encoding method. For example, a DC prediction mode in HEVC is replaced by the intra-frame encoding method in the present application, and the DC prediction mode or a planar prediction mode is used as an intra-frame prediction mode for the first-type pixel. An actual intra-frame encoding mode for a picture block may be obtained by means of common rate-distortion optimization. That is, the picture block is pre-encoded using multiple candidate intra-frame encoding modes, rate-distortion costs of each mode are determined, and a mode with minimum rate-distortion costs is used as the actual encoding mode for the picture block.

It should be noted that the examples in FIG. 1 to FIG. 5C are merely intended to help a person skilled in the art understand the embodiments of the present application instead of limiting the embodiments of the present application to a specific value or a specific scenario shown in the examples. A person skilled in the art certainly can make various equivalent modifications or changes according to the examples provided in FIG. 1 to FIG. 5C, and such modifications or changes also fall within the scope of the embodiments of the present application.

It should be understood that sequence numbers of the foregoing processes do not mean execution orders. Execution orders of the processes should be determined according to functions and internal logic of the processes, and shall not set any limitation on an implementation process of the embodiments of the present application.

The encoding method in the embodiments of the present application is described in detail above with reference to FIG. 1 to FIG. 5C. A decoding method in the embodiments of the present application is described in detail below with reference to FIG. 6.

FIG. 6 is a schematic flowchart of an intra-frame decoding method according to an embodiment of the present application. The method shown in FIG. 6 may be performed by a decoder. The intra-frame decoding method shown in FIG. 6 corresponds to the intra-frame encoding method shown in FIG. 1. The method shown in FIG. 6 may be an inverse process of the method shown in FIG. 1. Further, the method shown in FIG. 6 includes the following steps.

Step 610: Obtain reference pixel values of a current picture block.

Step 620: Obtain a predicted value of a first-type pixel in the current picture block according to the reference pixel values of the current picture block using an intra-frame prediction algorithm, where the current picture block includes the first-type pixel and second-type pixel, and the second-type pixel is a pixel in the current picture block except the first-type pixel.

Step 630: Dequantize quantized transform coefficients of the current picture block to obtain transform coefficients.

Step 640: Inversely transform the transform coefficients to obtain reconstructed residual values of the first-type pixel.

Step 650: Add the reconstructed residual values of the first-type pixel and the predicted value of the first-type pixel to obtain a reconstructed value of the first-type pixel.

Step 660: Obtain a reconstructed value of the second-type pixel according to the reconstructed value of the first-type pixel using an interpolation method.

Therefore, in this embodiment of the present application, a first-type pixel is reconstructed according to quantized transform coefficients and a predicted value of the first-type pixel (one part of pixels) to obtain a reconstructed value of the first-type pixel. In addition, second-type pixel (the other part of pixels) are directly reconstructed using an interpolation method that is based on reference pixels and/or the reconstructed part of pixels. Therefore, a bit rate is reduced. By means of the method for classifying a code block into two types of pixels and separately decoding the two types of pixels in different manners, flexible decoding can be performed, and decoding efficiency can be improved.

It should be understood that the picture block in this embodiment of the present application may be in multiple sizes, for example, may be in a size of 3×3, 4×4, 8×8, 16×16, 32×32, 64×64, 8×4, 4×8, 16×12, or 9×9. This embodiment of the present application is not limited thereto.

It should be noted that a first-type pixel may be a pixel at any location in the current picture block. For example, the first-type pixel may be at a location such as a right boundary, a lower boundary, a center, an upper-right to lower-left diagonal, an upper-left to lower-right diagonal, or the like in the current picture block. A quantity of first-type pixels is greater than 0 and is less than a quantity of pixels in the entire current picture block. For example, the quantity of first-type pixels is ½, ⁷⁄₁₆, ¹⁵⁄₃₂, ¾, ¼, or the like of the quantity of pixels in the entire current picture block. The second-type pixel is a pixel in the current picture block except the first-type pixel.

FIGS. 2A-2H are classification examples of first-type pixels and second-type pixels in a 4×4 picture block according to an embodiment of the present application. Eight examples are given in FIGS. 2A-2H. In an example of this embodiment, a classification case of first-type pixels and second-type pixels in FIG. 2A may be used.

It should be understood that classification of first-type pixels and second-type pixels in a larger picture block may be considered as a combination of multiple small picture blocks. For example, pixel classification of an 8×8 picture block or a larger picture block may be a combination of pixel classification of four or more picture blocks each with a size that is smaller than a size of the picture block. For example, pixel classification of an 8×8 block in an example in FIG. 3A is obtained by repeatedly using the pixel classification of the 4×4 block in an example in FIG. 2A, that is, pixel classification of each of four 4×4 blocks in the 8×8 block is performed using the pixel classification method of the 4×4 block in the example in FIG. 2A. Alternatively, pixel classification of an 8×8 block or a larger block may be performed in another manner, for example, in a pixel classification manner in FIG. 2B, FIG. 2C, or FIG. 2D. Same pixel classification may be used for all intra-frame prediction modes, or different pixel classification may be used for each intra-frame prediction mode, or same pixel classification may be used for several intra-frame prediction modes. For brief description, an example of using the pixel classification method in FIG. 2A for a 4×4 picture block is mainly used in the following embodiment to describe a specific processing method.

It should be understood that in step 620, information about the intra-frame prediction algorithm may be obtained by parsing a bit-stream. The intra-frame prediction algorithm may include directional prediction, DC prediction, or planar prediction in H.265/HEVC or H.264/AVC, or may be intra-frame prediction that is based on template matching, or the like. This is not limited in this embodiment of the present application.

Optionally, in another embodiment, before step 640, the method in this embodiment of the present application further includes placing the transform coefficients at first-type preset locations in a transform coefficient matrix in a transform coefficient scanning order, where transform coefficients at second-type preset locations in the transform coefficient matrix are set to preset values, and a sum of a quantity of the second-type preset locations and a quantity of the first-type preset locations is equal to a total quantity of transform coefficients in the transform coefficient matrix.

It should be understood that the quantized transform coefficients may be obtained by parsing the bit-stream. For example, dequantization processing may be multiplying the quantized transform coefficients by a quantization step to obtain reconstructed transform coefficients. The operation of multiplying the quantized transform coefficients by the quantization step may be usually completed by means of integer multiplication and shift. For example, a dequantization process in H.265/HEVC is as follows:

$$R(i)=\text{sign}\{Q(i)\}\cdot(Q(i)\cdot Qs'(i)+(1<<(bd\text{shift}-1)))>>bd\text{shift}.$$

Herein, sign $\{X\}$ means obtaining a sign of X, $Q(i)$ is an $i^{th}$ quantized transform coefficient, $R(i)$ is a reconstructed transform coefficient, bdshift is a shift parameter, $Qs'(i)$ is an integer, and $Qs'(i)/2^{bdshift}$ is approximately the quantization step. $Qs'(i)$ depends on both a level scale and a scaling factor.

The transform coefficients are obtained after the dequantization. The transform coefficients may be placed at the first-type preset locations in the transform coefficient matrix in the transform coefficient scanning order. The transform coefficients at the second-type preset locations in the transform coefficient matrix are set to the preset values. The quantity of the second-type preset locations is less than the total quantity of transform coefficients in the transform coefficient matrix. For example, the preset value may be 0.

In another embodiment, the scanning order includes vertical scanning, horizontal scanning, or diagonal scanning.

It should be understood that the scanning order may depend on an intra-frame prediction mode for the first-type pixel, or may be transmitted in the bit-stream.

For example, three scanning orders shown in FIGS. 5A-5C are respectively the vertical scanning in FIG. 5A, the horizontal scanning in FIG. 5B, or the diagonal scanning in FIG. 5C.

Optionally, in step 630, there are multiple inverse transform forms. For example, Two-dimensional discrete transform such as inverse DCT transform or inverse DST transform may be used. When a square is transformed, inverse transform processing is shown in the following formula:

$$E = H^T \cdot \overset{\mathrm{p}}{C} \cdot H.$$

Herein, $\overset{\mathrm{p}}{C}$ is a transform coefficient matrix that is reconstructed after dequantization and includes multiple reconstructed transform coefficients, E is a reconstructed residual value matrix that includes multiple reconstructed residual values, and H is a transform matrix. Residual values obtained after inverse transform include at least residual values of all the first-type pixels, and may further include a residual value of at least one second-type pixel. An inverse transform size may be the same as a size of a picture block. In this case, a quantity of residual values generated using inverse transform is equal to a quantity of pixels in the picture block. The two-dimensional discrete transform such as the two-dimensional DST and the two-dimensional DCT meets that a size of a transform matrix is equal to a size of a picture block. Alternatively, an inverse transform size may be smaller than a size of a picture block. For example, a 3×3 block in the lower right corner of a 4×4 block in an example in FIG. 2F includes all the first-type pixels. In this case, reconstructed transform coefficients are inversely transformed using 3×3 inverse transform, to obtain residual values of the 3×3 block. For another example, 4×4 inverse transform may be separately used for the four 4×4 blocks in the 8×8 block in the example in FIG. 3A to obtain residual values of the four 4×4 blocks. Both residual values of a first-type pixel in a picture block and residual values of a second-type pixel in the picture block may be generated using inverse transform. To reduce calculation, only the residual values of the first-type pixel may be generated while the residual values of the second-type pixel are not generated.

It should be understood that a reconstructed value obtained by adding a residual value and a predicted value may exceed a dynamic range of a pixel. For example, a dynamic range of an 8-bit pixel is 0 to 255. Therefore, in this embodiment of the present application, when a predicted value obtained by adding a residual value and a predicted value exceeds an upper limit or a lower limit of a dynamic range of a pixel, the predicted value is set to a maximum value or a minimum value of the dynamic range, for example, set to 255 or 0.

Optionally, in another embodiment, before step 660, the method in this embodiment of the present application further includes determining the interpolation method according to the intra-frame prediction algorithm, where an interpolation manner in the interpolation method is the same as an interpolation manner included in the intra-frame prediction algorithm.

Alternatively, in another embodiment, before step 660, the method in this embodiment of the present application further includes determining the interpolation method according to a bit-stream of the picture block.

In other words, the interpolation method may be determined using the intra-frame prediction algorithm in step 620. The reconstructed value of the second-type pixel may be further determined according to the reconstructed value of the first-type pixel using the interpolation method.

Further, there are multiple interpolation methods. The following describes several methods for reconstructing the second-type pixel.

Method 1 is an interpolation method that is based on an average of surrounding pixels. Surrounding reference pixels of the second-type pixel and/or the reconstructed first-type pixel is obtained. Weighted averaging is performed on the pixels to obtain the reconstructed value of the second-type pixel by means of interpolation.

Method 2 is a direction-based interpolation method. According to a predetermined interpolation direction, reference pixels of the second-type pixel in this direction and/or the reconstructed first-type pixel is obtained, and the reconstructed value of the second-type pixel is obtained using an interpolation filter.

Method 3 is a hybrid interpolation method. Reference pixels surrounding second-type pixel at a predetermined location and/or the reconstructed first-type pixel is obtained. A reconstructed value of the second-type pixel is obtained by means of linear interpolation. Then, for a second-type pixel at another locations, according to a predetermined direction, reference pixels of the second-type pixel in the direction and/or the reconstructed first-type pixel, and the reconstructed second-type pixel is obtained. A reconstructed value of the second-type pixel is obtained by means of linear interpolation.

Method 4 is a transform-based interpolation method. A location of the second-type pixel is padded with a preset value, such as 0 or 128. A pixel block that includes reference pixels, the reconstructed first-type pixel, and a padded second-type pixel is transformed. Inverse transform is performed after transform coefficients at preset locations are removed to obtain the reconstructed value of the second-type pixel.

In Method 5, an intra-frame prediction mode in HEVC is used as the interpolation method for the second-type pixel. In this case, an intra-frame prediction mode for the first-type pixel may be the same as or may be different from the intra-frame prediction mode used for interpolation of the second-type pixel.

It should be understood that the second-type pixel may be reconstructed using one of the foregoing methods, or the second-type pixel may be reconstructed using a combination of several foregoing methods. This is not limited in this embodiment of the present application.

Information about the interpolation method for the second-type pixel may be obtained by parsing the bit-stream, or may be obtained by means of mapping according to the intra-frame prediction mode for the first-type pixel. For example, when the intra-frame prediction mode for the first-type pixel is the directional prediction mode (for example, at least one of No. 2 to No. 34 prediction modes specified in HEVC), the directional interpolation method that is based on a same direction is used for the second-type pixel. Alternatively, corresponding preset interpolation methods for the second-type pixel may be used for several intra-frame prediction modes for the first-type pixel, and for the remaining intra-frame prediction modes for the first-type pixel, the interpolation method for the second-type pixel is obtained by parsing the bit-stream.

It should be noted that different intra-prediction modes for the first-type pixel may have same or different pixel classification of the first-type pixel and the second-type pixel. For example, a same pixel classification manner is used in several intra-frame prediction modes for the first-type pixel, or different pixel classification manners are used in intra-frame prediction modes for the first-type pixel. Further, a 4×4 block is used as an example. When the intra-frame prediction mode for the first-type pixel is the DC mode, a pixel classification manner in FIG. 2A is used. When the intra-frame prediction mode for the first-type pixel is a vertical mode, a pixel classification manner in FIG. 2D is used.

Generally, a part of processing in the decoding method should be the same as or should match processing in the encoding method. Only in this case, an encoded reconstructed picture can be the same as a decoded reconstructed picture. For example, the pixel classification, the intra-frame prediction method for the first-type pixel, the coefficient scanning method, and the interpolation method for the second-type pixel in the decoding method should be the same as the corresponding methods on an encoding side. The processing such as the inverse transform and the entropy decoding in the decoding method should match the transform and the entropy encoding in the encoding method. That is, the processing is inverse processing of the corresponding methods in the encoding method. In addition, encoding also includes pixel reconstruction processing. The reconstruction processing also should be the same as the reconstruction processing in decoding. For example, dequantization and inverse transform for the quantized transform coefficients in encoding should be the same as the dequantization and inverse transform for the quantized transform coefficients in decoding.

It should be noted that the intra-frame decoding method in FIG. 6 corresponds to the intra-frame encoding method in FIG. 1 to FIG. 5C, the decoding method that performs FIG. 6 can implement inverse processes of the processes in the method embodiment in FIG. 1 to FIG. 5C, and the intra-frame decoding method in FIG. 6 can be obtained according to an inverse process corresponding to the intra-frame encoding method in FIG. 1 to FIG. 5C. To avoid repetition, details are not described herein again.

The intra-frame encoding method and the intra-frame decoding method in the embodiments of the present application are described in detail above with reference to FIG. 1 to FIG. 6. An encoder and a decoder in the embodiments of the present application are described below with reference to FIG. 7 to FIG. 10.

Figure 7:
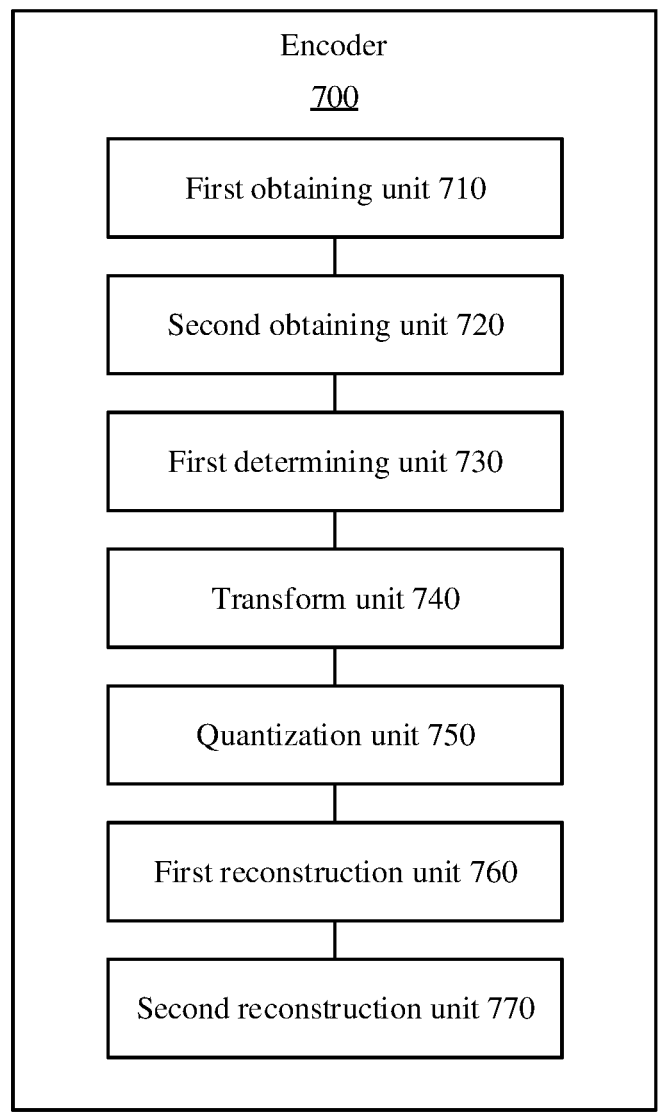
FIG. 7 is a schematic block diagram of an encoder according to an embodiment of the present application.

FIG. 7 is a schematic block diagram of an encoder 700 according to an embodiment of the present application. The encoder 700 shown in FIG. 7 includes a first obtaining unit 710, a second obtaining unit 720, a first determining unit 730, a transform unit 740, a quantization unit 750, a first reconstruction unit 760, and a second reconstruction unit 770.

The first obtaining unit 710 is configured to obtain reference pixel values of a current picture block. The second obtaining unit 720 is configured to obtain a predicted value of a first-type pixel in the current picture block according to the reference pixel values of the current picture block using an intra-frame prediction algorithm, where the current picture block includes the first-type pixel and a second-type pixel, and the second-type pixel is a pixel in the current picture block except the first-type pixel. The first determining unit 730 is configured to obtain residual values of the first-type pixel according to the predicted value of the first-type pixel and an original pixel value of the first-type pixel. The transform unit 740 is configured to obtain transform coefficients according to the residual values of the first-type pixel. The quantization unit 750 is configured to quantize the transform coefficients to obtain quantized transform coefficients. The first reconstruction unit 760 is configured to reconstruct the first-type pixel according to the quantized transform coefficients and the predicted value of the first-type pixel, to obtain a reconstructed value of the first-type pixel. The second reconstruction unit 770 is configured to obtain a reconstructed value of the second-type pixel according to reference pixels of the picture block and/or the reconstructed value of the first-type pixel using an interpolation method.

Therefore, in this embodiment of the present application, transform and quantization processing is performed only on residual values of a first-type pixel to obtain a bit-stream. Residual values of an entire picture block do not need to be all encoded. Therefore, flexible encoding can be implemented, and encoding efficiency can be improved.

Further, in this embodiment of the present application, the first-type pixel is reconstructed according to quantized transform coefficients and a predicted value of the first-type pixel (one part of pixels) to obtain a reconstructed value of the first-type pixel. In addition, a second-type pixel (the other part of pixels) is directly reconstructed using an interpolation method that is based on reference pixels and/or the reconstructed part of pixels. By means of the method for classifying a code block into two types of pixels and separately encoding and reconstructing the two types of pixels in different manners, a bitrate can be reduced, and encoding efficiency can be improved.

It should be understood that the current picture block may be any one or one type of picture block in a current frame. The picture block in this embodiment of the present application may be in multiple sizes, for example, may be in a size of 3×3, 4×4, 8×8, 16×16, 32×32, 64×64, 8×4, 4×8, 16×12, or 9×9. This embodiment of the present application is not limited thereto.

It should be noted that a first-type pixel may be a pixel at any location in the current picture block. For example, the first-type pixel may be at a location such as a right boundary, a lower boundary, a center, an upper-right to lower-left diagonal, an upper-left to lower-right diagonal, or the like in the current picture block. A quantity of first-type pixels is greater than 0 and is less than a quantity of pixels in the entire current picture block. For example, the quantity of first-type pixels is ½, 7/16, 15/32, ¾, ¼, or the like of the quantity of pixels in the entire current picture block. The second-type pixel is a pixel in the picture block except the first-type pixel.

FIGS. 2A-2H are classification examples of first-type pixels and second-type pixels in a 4×4 picture block according to an embodiment of the present application. Eight examples are given in FIG. 2A to FIG. 2H. In an example of this embodiment, a classification case of first-type pixels and second-type pixels in FIG. 2A may be used.

It should be understood that classification of first-type pixels and second-type pixels in a larger picture block may be considered as a combination of multiple small picture blocks. For example, pixel classification of an 8×8 picture block or a larger picture block may be a combination of pixel classification of four or more picture blocks each with a size that is smaller than a size of the picture block. For example, pixel classification of an 8×8 block in an example in FIG. 3A is obtained by repeatedly using the pixel classification of the 4×4 block in an example in FIG. 2A, that is, pixel classification of each of four 4×4 blocks in the 8×8 block is performed using the pixel classification method of the 4×4 block in the example in FIG. 2A. Alternatively, pixel classification of an 8×8 block or a larger block may be performed in another manner, for example, in a pixel classification manner in FIG. 2B, FIG. 2C, or FIG. 2D. Same pixel classification may be used for all intra-frame prediction modes, or different pixel classification may be used for each intra-frame prediction mode, or same pixel classification may be used for several intra-frame prediction modes. For brief description, an example of using the pixel classification method in FIG. 2A for a 4×4 picture block is mainly used in the following embodiment to describe a specific processing method.

It should be understood that the intra-frame prediction algorithm may include directional prediction, DC prediction, or planar prediction in H.265/HEVC or H.264/AVC, or may be intra-frame prediction that is based on template matching, or the like. This is not limited in this embodiment of the present application.

It should be understood that when the predicted value of the first-type pixel is generated using the intra-frame prediction algorithm, a predicted value of the second-type pixel may be further generated.

It should be further understood that according to this embodiment of the present application, a decoding device and an encoding device may be a same device, or a decoding device and an encoding device may be different devices. This is not limited in this embodiment of the present application.

Optionally, in another embodiment, the encoder 700 further includes a second determining unit (not shown). The second determining unit is configured to determine the interpolation method according to the intra-frame prediction algorithm, where an interpolation manner in the interpolation method is the same as an interpolation manner included in the intra-frame prediction algorithm.

Optionally, in another embodiment, the first determining unit 730 is further configured to perform subtraction between the original value of the first-type pixel and the predicted value of the first-type pixel to obtain the residual values of the first-type pixel.

Optionally, in another embodiment, the transform unit 740 is further configured to obtain residual values of B pixels in the second-type pixel according to the residual values of the first-type pixel, where B is a positive integer that is not less than 1, and transform the residual values of the first-type pixel and the residual values of the B pixels to obtain the transform coefficients, where a quantity of fixed 0 coefficients in the transform coefficients is equal to B.

In another embodiment, a quantity of the residual values of the first-type pixel is A. The B pixels in the second-type pixel correspond to the B residual values. The A residual values are in a one-to-one correspondence with the pixels in the first-type pixel, and the B residual values are in a one-to-one correspondence with the B pixels. The third obtaining unit is further configured to determine a B×A matrix corresponding to the quantity A of the residual values of the first-type pixel and a quantity B of the residual values of the B pixels in the second-type pixel, multiply the B×A matrix by a column vector that includes the A residual values of the first-type pixel, to obtain a column vector that includes the residual values of the B pixels in the second-type pixel, and obtain the residual values of the B pixels in the second-type pixel according to the column vector that includes the residual values of the B pixels in the second-type pixel.

Alternatively, in another embodiment, the transform unit 740 is further configured to subtract a predicted value of each pixel from an original value of each of at least one pixel in the second-type pixel, to obtain a residual value of each pixel, where the predicted value of each pixel is obtained using the intra-frame prediction algorithm, and transform the residual values of the first-type pixel and a residual value of the at least one pixel in the second-type pixel to obtain the transform coefficients.

Optionally, in another embodiment, the quantization unit 750 is further configured to quantize the transform coefficients in a transform coefficient scanning order to obtain the quantized transform coefficients.

In another embodiment, the quantization unit 750 is further configured to obtain the quantized transform coefficients according to the following formula $$\tilde{C}_m = Q(C_m + \Delta_m),$$

where $$\Delta_m = \frac{1}{b_{m,m}} \sum_{j=m+1}^{N} b_{m,j}(C_j - \tilde{C}_j),$$

and $C_m$ is an $m^{th}$ transform coefficient in the scanning order except the fixed 0 coefficients, $\tilde{C}_m$ is a quantized transform coefficient of $C_m$, $Q(*)$ is a quantization processing function, $\Delta_m$ is a correction term that depends on a quantization error of a transform coefficient after $C_m$, $b_{m,j}$ is a weighting coefficient that depends on a transform matrix and a location of the first-type pixel in the scanning order, m=1, 2, ..., M, M is a quantity of first-type pixels, and N is a total quantity of first-type pixels and second-type pixels.

Optionally, in another embodiment, the second reconstruction unit 770 dequantizes the quantized transform coefficients to obtain reconstructed transform coefficients, inversely transforms the reconstructed transform coefficients to obtain reconstructed residual values of the first-type pixel, and adds the reconstructed residual values of the first-type pixel and the predicted value of the first-type pixel to obtain the reconstructed value of the first-type pixel.

Optionally, in another embodiment, the encoder 700 further includes a generation unit (not shown). The generation unit is configured to generate a bit-stream according to the quantized transform coefficients such that a decoding device reconstructs the current picture block according to the bit-stream.

In another embodiment, the generation unit is further configured to encode the quantized transform coefficients and information about the intra-frame prediction algorithm using an entropy encoding method, to obtain the bit-stream.

Alternatively, in another embodiment, the generation unit is further configured to encode information about the intra-frame prediction algorithm, the quantized transform coefficients, and information about the interpolation method using an entropy encoding method, to obtain the bit-stream.

It should be understood that the encoder 700 shown in FIG. 7 can implement the processes completed by the encoder in the method embodiment in FIG. 1 to FIG. 5C. For other functions and operations of the encoder 700, refer to the processes of the encoder in the method embodiment in FIG. 1 to FIG. 5C. To avoid repetition, details are not described herein again.

Figure 8:
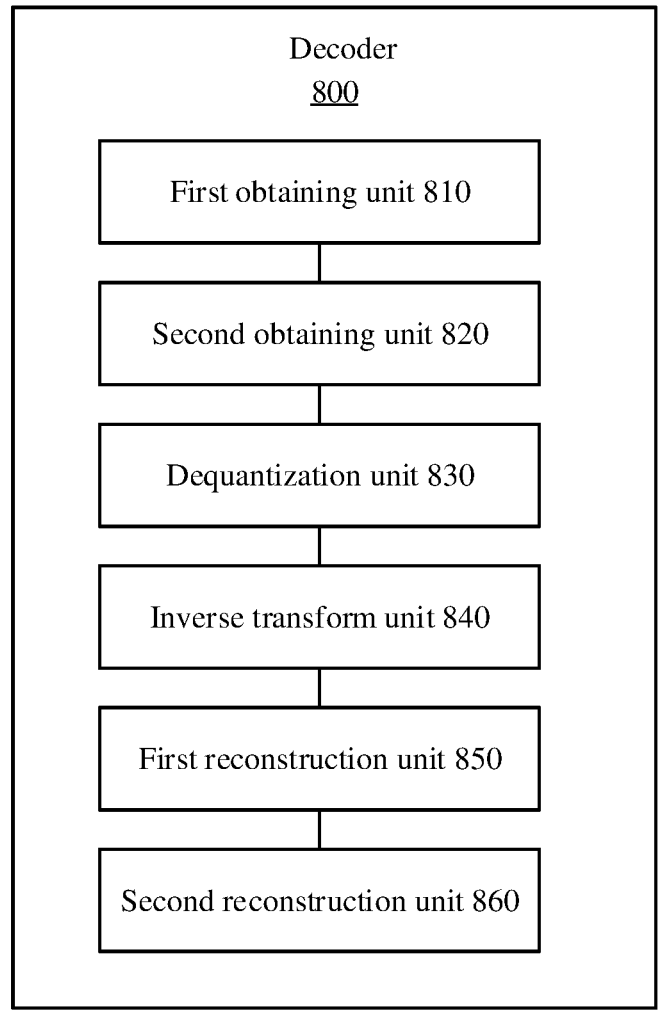
FIG. 8 is a schematic block diagram of a decoder according to an embodiment of the present application.

FIG. 8 is a schematic block diagram of a decoder 800 according to an embodiment of the present application. The decoder 800 shown in FIG. 8 includes a first obtaining unit 810, a second obtaining unit 820, a dequantization unit 830, an inverse transform unit 840, a first reconstruction unit 850, and a second reconstruction unit 860.

Further, the first obtaining unit 810 is configured to obtain reference pixel values of a current picture block. The second obtaining unit 820 is configured to obtain a predicted value of a first-type pixel in the current picture block according to the reference pixel values of the current picture block using an intra-frame prediction algorithm, where the current picture block includes the first-type pixel and second-type pixel, and the second-type pixel is a pixel in the current picture block except the first-type pixel. The dequantization unit 830 is configured to dequantize quantized transform coefficients of the current picture block to obtain transform coefficients. The inverse transform unit 840 is configured to inversely transform the transform coefficients to obtain reconstructed residual values of the first-type pixel. The first reconstruction unit 850 is configured to add the reconstructed residual values of the first-type pixel and the predicted value of the first-type pixel to obtain a reconstructed value of the first-type pixel. The second reconstruction unit 860 is configured to obtain a reconstructed value of the second-type pixel according to reference pixels of the picture block and/or the reconstructed value of the first-type pixel using an interpolation method.

Therefore, in this embodiment of the present application, a first-type pixel is reconstructed according to quantized transform coefficients and a predicted value of the first-type pixel (one part of pixels) to obtain a reconstructed value of the first-type pixel. In addition, second-type pixel (the other part of pixels) are directly reconstructed using an interpolation method that is based on reference pixels and/or the reconstructed part of pixels. Therefore, a bit rate is reduced. By means of the method for classifying a code block into two types of pixels and separately decoding the two types of pixels in different manners, flexible decoding can be performed, and decoding efficiency can be improved.

It should be understood that the current picture block may be any one or one type of picture block in a current frame. The picture block in this embodiment of the present application may be in multiple sizes, for example, may be in a size of 3×3, 4×4, 8×8, 16×16, 32×32, 64×64, 8×4, 4×8, 16×12, or 9×9. This embodiment of the present application is not limited thereto.

It should be noted that a first-type pixel may be a pixel at any location in the current picture block. For example, the first-type pixel may be at a location such as a right boundary, a lower boundary, a center, an upper-right to lower-left diagonal, an upper-left to lower-right diagonal, or the like in the current picture block. A quantity of first-type pixels is greater than 0 and is less than a quantity of pixels in the entire current picture block. For example, the quantity of first-type pixels is ½, 7/16, 15/32, ¾, ¼, or the like of the quantity of pixels in the entire current picture block. The second-type pixel is a pixel in the picture block except the first-type pixel.

FIGS. 2A-2H are classification examples of first-type pixels and second-type pixels in a 4×4 picture block according to an embodiment of the present application. Eight examples are given in FIG. 2A to FIG. 2H. In an example of this embodiment, a classification case of first-type pixels and second-type pixels in FIG. 2A may be used.

It should be understood that classification of first-type pixels and second-type pixels in a larger picture block may be considered as a combination of multiple small picture blocks. For example, pixel classification of an 8×8 picture block or a larger picture block may be a combination of pixel classification of four or more picture blocks each with a size that is smaller than a size of the picture block. For example, pixel classification of an 8×8 block in an example in FIG. 3A is obtained by repeatedly using the pixel classification of the 4×4 block in an example in FIG. 2A, that is, pixel classification of each of four 4×4 blocks in the 8×8 block is performed using the pixel classification method of the 4×4 block in the example in FIG. 2A. Alternatively, pixel classification of an 8×8 block or a larger block may be performed in another manner, for example, in a pixel classification manner in FIG. 2B, FIG. 2C, or FIG. 2D. Same pixel classification may be used for all intra-frame prediction modes, or different pixel classification may be used for each intra-frame prediction mode, or same pixel classification may be used for several intra-frame prediction modes. For brief description, an example of using the pixel classification method in FIG. 2A for a 4×4 picture block is mainly used in the following embodiment to describe a specific processing method.

It should be understood that the intra-frame prediction algorithm may include directional prediction, DC prediction, or planar prediction in H.265/HEVC or H.264/AVC, or may be intra-frame prediction that is based on template matching, or the like. This is not limited in this embodiment of the present application.

It should be understood that when the predicted value of the first-type pixels is generated using the intra-frame prediction algorithm, a predicted value of the second-type pixel may be further generated.

It should be further understood that according to this embodiment of the present application, a decoding device and an encoding device may be a same device, or a decoding device and an encoding device may be different devices. This is not limited in this embodiment of the present application.

Optionally, in another embodiment, the decoder 800 further includes a placement unit (not shown). The placement unit is configured to place the transform coefficients at first-type preset locations in a transform coefficient matrix in a transform coefficient scanning order, where transform coefficients at second-type preset locations in the transform coefficient matrix are set to preset values, and a sum of a quantity of the second-type preset locations and a quantity of the first-type preset locations is equal to a total quantity of transform coefficients in the transform coefficient matrix.

Optionally, in another embodiment, the decoder 800 further includes a first determining unit (not shown). Further, the first determining unit is configured to determine the interpolation method according to the intra-frame prediction algorithm, where an interpolation manner in the interpolation method is the same as an interpolation manner included in the intra-frame prediction algorithm.

Alternatively, in another embodiment, the decoder 800 further includes a second determining unit (not shown). Further, the second determining unit is configured to determine the interpolation method according to a bit-stream of the picture block.

It should be understood that the decoder 800 shown in FIG. 8 can implement the processes completed by the decoder in the method embodiment in FIG. 6. For other functions and operations of the decoder 800, refer to the processes of the decoder in the method embodiment in FIG. 6. To avoid repetition, details are not described herein again.

Figure 9:
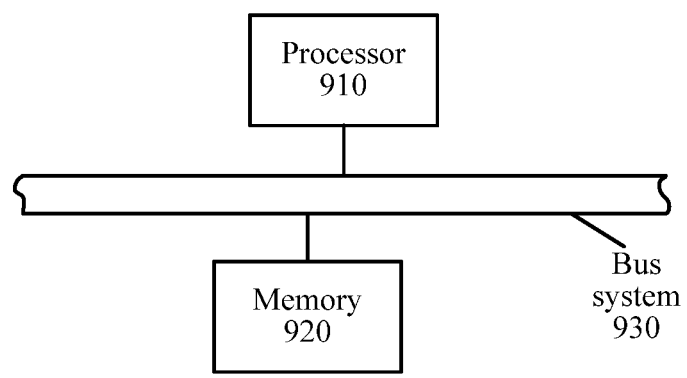
FIG. 9 is a schematic block diagram of an encoder according to another embodiment of the present application.

FIG. 9 is a schematic block diagram of an encoder 900 according to another embodiment of the present application. The encoder 900 shown in FIG. 9 includes a processor 910, a memory 920, and a bus system 930.

The processor 910 invokes, using the bus system 930, code stored in the memory 920 to obtain reference pixel values of a current picture block, obtain a predicted value of a first-type pixel in the current picture block according to the reference pixel values of the current picture block using an intra-frame prediction algorithm, where the current picture block includes the first-type pixel and second-type pixel, and the second-type pixel is a pixel in the current picture block except the first-type pixel, obtain residual values of the first-type pixel according to the predicted value of the first-type pixel and an original pixel value of the first-type pixel, obtain transform coefficients according to the residual values of the first-type pixel, quantize the transform coefficients to obtain quantized transform coefficients, reconstruct the first-type pixel according to the quantized transform coefficients and the predicted value of the first-type pixel, to obtain a reconstructed value of the first-type pixel, and obtain a reconstructed value of the second-type pixel according to the reconstructed value of the first-type pixel using an interpolation method.

Therefore, in this embodiment of the present application, transform and quantization processing is performed only on residual values of a first-type pixel to obtain a bit-stream. Residual values of an entire picture block do not need to be all encoded. Therefore, flexible encoding can be implemented, and encoding efficiency can be improved.

Further, in this embodiment of the present application, the first-type pixel is reconstructed according to quantized transform coefficients and a predicted value of the first-type pixel (one part of pixels) to obtain a reconstructed value of the first-type pixel. In addition, a second-type pixel (the other part of pixels) is directly reconstructed using an interpolation method that is based on reference pixels and/or the reconstructed part of pixels. By means of the method for classifying a code block into two types of pixels and separately encoding and reconstructing the two types of pixels in different manners, a bitrate can be reduced, and encoding efficiency can be improved.

The method disclosed in the foregoing embodiment of the present application may be applied to the processor 910, or may be implemented by the processor 910. The processor

910 may be an integrated circuit chip, and has a signal processing capability. In an implementation process, the steps in the foregoing method may be completed by means of an integrated logic circuit of hardware in the processor 910 or an instruction in a form of software. The processor 910 may be a general purpose processor, a digital signal processor (DSP), an application-specific integrated circuit (ASIC), a field programmable gate array (FPGA) or another programmable logic device, a discrete gate or a transistor logic device, or a discrete hardware assembly. The processor 910 may implement or perform the methods, the steps, and the logical block diagrams disclosed in the embodiments of the present application. The general purpose processor may be a microprocessor, or the processor 910 may be any conventional processor, or the like. The steps of the method disclosed with reference to the embodiments of the present application may be directly performed and completed by a hardware decoding processor, or may be performed and completed by a combination of a hardware module and a software module in a decoding processor. The software module may be located in a mature storage medium in the art, such as a random access memory (RAM), a flash memory, a read-only memory (ROM), a programmable ROM (PROM) or an electrically erasable PROM (EE-PROM), or a register. The storage medium is located in the memory 920. The processor 910 reads information from the memory 920, and completes the steps of the foregoing method in combination with hardware of the processor 910. In addition to a data bus, the bus system 930 may further include a power bus, a control bus, a status signal bus, and the like. However, for clear description, various types of buses in the figure are marked as the bus system 930.

It should be understood that the current picture block may be any one or one type of picture block in a current frame. The picture block in this embodiment of the present application may be in multiple sizes, for example, may be in a size of 3×3, 4×4, 8×8, 16×16, 32×32, 64×64, 8×4, 4×8, 16×12, or 9×9. This embodiment of the present application is not limited thereto.

It should be noted that a first-type pixel may be a pixel at any location in the current picture block. For example, the first-type pixel may be at a location such as a right boundary, a lower boundary, a center, an upper-right to lower-left diagonal, an upper-left to lower-right diagonal, or the like in the current picture block. A quantity of first-type pixels is greater than 0 and is less than a quantity of pixels in the entire current picture block. For example, the quantity of first-type pixels is ½, 7/16, 15/32, ¾, ¼, or the like of the quantity of pixels in the entire current picture block. The second-type pixel is a pixel in the picture block except the first-type pixel.

FIGS. 2A-2H are classification examples of first-type pixels and second-type pixels in a 4×4 picture block according to an embodiment of the present application. Eight examples are given in FIG. 2A to FIG. 2H. In an example of this embodiment, a classification case of first-type pixels and second-type pixels in FIG. 2A may be used.

It should be understood that classification of first-type pixels and second-type pixels in a larger picture block may be considered as a combination of multiple small picture blocks. For example, pixel classification of an 8×8 picture block or a larger picture block may be a combination of pixel classification of four or more picture blocks each with a size that is smaller than a size of the picture block. For example, pixel classification of an 8×8 block in an example in FIG. 3A is obtained by repeatedly using the pixel classification of the 4×4 block in an example in FIG. 2A, that is, pixel classification of each of four 4×4 blocks in the 8×8 block is performed using the pixel classification method of the 4×4 block in the example in FIG. 2A. Alternatively, pixel classification of an 8×8 block or a larger block may be performed in another manner, for example, in a pixel classification manner in FIG. 2B, FIG. 2C, or FIG. 2D. Same pixel classification may be used for all intra-frame prediction modes, or different pixel classification may be used for each intra-frame prediction mode, or same pixel classification may be used for several intra-frame prediction modes. For brief description, an example of using the pixel classification method in FIG. 2A for a 4×4 picture block is mainly used in the following embodiment to describe a specific processing method.

It should be understood that the intra-frame prediction algorithm may include directional prediction, DC prediction, or planar prediction in H.265/HEVC or H.264/AVC, or may be intra-frame prediction that is based on template matching, or the like. This is not limited in this embodiment of the present application.

It should be understood that when the predicted value of the first-type pixel is generated using the intra-frame prediction algorithm, a predicted value of the second-type pixel may be further generated.

It should be further understood that according to this embodiment of the present application, a decoding device and an encoding device may be a same device, or a decoding device and an encoding device may be different devices. This is not limited in this embodiment of the present application.

Optionally, in another embodiment, the processor 910 is further configured to determine the interpolation method according to the intra-frame prediction algorithm, where an interpolation manner in the interpolation method is the same as an interpolation manner included in the intra-frame prediction algorithm.

Optionally, in another embodiment, the processor 910 is further configured to perform subtraction between the original value of the first-type pixel and the predicted value of the first-type pixel to obtain the residual values of the first-type pixel.

Optionally, in another embodiment, the processor 910 is further configured to obtain residual values of B pixels in the second-type pixel according to the residual values of the first-type pixel, where B is a positive integer that is not less than 1, and transform the residual values of the first-type pixel and the residual values of the B pixels to obtain the transform coefficients, where a quantity of fixed 0 coefficients in the transform coefficients is equal to B.

Further, in another embodiment, a quantity of the residual values of the first-type pixel is A. The B pixels in the second-type pixel correspond to the B residual values. The A residual values are in a one-to-one correspondence with the pixels in the first-type pixel, and the B residual values are in a one-to-one correspondence with the B pixels. The processor 910 is further configured to determine a B×A matrix corresponding to the quantity A of the residual values of the first-type pixel and a quantity B of the residual values of the B pixels in the second-type pixel, multiply the B×A matrix by a column vector that includes the A residual values of the first-type pixel to obtain a column vector that includes the residual values of the B pixels in the second-type pixel, and obtain the residual values of the B pixels in the second-type pixel according to the column vector that includes the residual values of the B pixels in the second-type pixel.

Alternatively, in another embodiment, the processor 910 is further configured to subtract a predicted value of each pixel from an original value of each of at least one pixel in the second-type pixel to obtain a residual value of each pixel, where the predicted value of each pixel is obtained using the intra-frame prediction algorithm, and transform the residual values of the first-type pixel and a residual value of the at least one pixel in the second-type pixel to obtain the transform coefficients.

Optionally, in another embodiment, the processor 910 is further configured to quantize the transform coefficients in a transform coefficient scanning order to obtain the quantized transform coefficients.

Further, in another embodiment, the processor 910 is further configured to obtain the quantized transform coefficients according to the following formula $$\check{C}_m = Q(C_m + \Delta_m),$$

where $$\Delta_m = \frac{1}{b_{m,m}} \sum_{j=m+1}^{N} b_{m,j}(C_j - \check{C}_j),$$

and $C_m$ is an $m^{th}$ transform coefficient in the scanning order except the fixed 0 coefficients, $\check{C}_m$ is a quantized transform coefficient of $C_m$, $Q(*)$ is a quantization processing function, $\Delta_m$ is a correction term that depends on a quantization error of a transform coefficient after $C_m$, $b_{m,j}$ is a weighting coefficient that depends on a transform matrix and a location of the first-type pixel in the scanning order, m=1, 2, . . . , M, M is a quantity of first-type pixels, and N is a total quantity of first-type pixels and second-type pixels.

Optionally, in another embodiment, the processor 910 is further configured to dequantize the quantized transform coefficients to obtain reconstructed transform coefficients, inversely transform the reconstructed transform coefficients to obtain reconstructed residual values of the first-type pixel, and add the reconstructed residual values of the first-type pixel and the predicted value of the first-type pixel to obtain the reconstructed value of the first-type pixel.

Optionally, in another embodiment, the processor 910 is further configured to generate a bit-stream according to the quantized transform coefficients such that a decoding device reconstructs the current picture block according to the bit-stream.

Optionally, in another embodiment, the processor 910 is further configured to encode the quantized transform coefficients and information about the intra-frame prediction algorithm using an entropy encoding method, to obtain the bit-stream.

Alternatively, in another embodiment, the processor 910 is further configured to encode information about the intra-frame prediction algorithm, the quantized transform coefficients, and information about the interpolation method using an entropy encoding method, to obtain the bit-stream.

It should be understood that the encoder 900 shown in FIG. 9 corresponds to the encoder 700 shown in FIG. 7, and can implement the processes completed by the encoder in the method embodiment in FIG. 1 to FIG. 5C. For other functions and operations of the encoder 900, refer to the processes of the encoder in the method embodiment in FIG. 1 to FIG. 5C. To avoid repetition, details are not described herein again.

Figure 10:
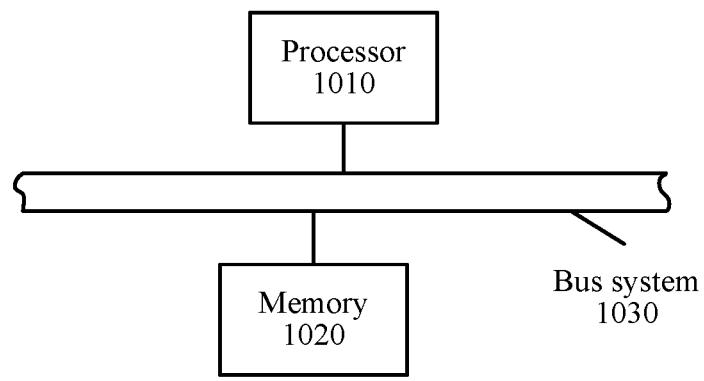
FIG. 10 is a schematic block diagram of a decoder according to an embodiment of the present application.

FIG. 10 is a schematic block diagram of a decoder 1000 according to an embodiment of the present application. The decoder 1000 shown in FIG. 10 includes a processor 1010, a memory 1020, and a bus system 1030.

The processor 1010 invokes, using the bus system 1030, code stored in the memory 1020 to obtain reference pixel values of a current picture block, obtain a predicted value of a first-type pixel in the current picture block according to the reference pixel values of the current picture block using an intra-frame prediction algorithm, where the current picture block includes the first-type pixel and a second-type pixel, and the second-type pixel is a pixel in the current picture block except the first-type pixel, dequantize quantized transform coefficients of the current picture block to obtain transform coefficients, inversely transform the transform coefficients to obtain reconstructed residual values of the first-type pixel, add the reconstructed residual values of the first-type pixel and the predicted value of the first-type pixel to obtain a reconstructed value of the first-type pixel, and obtain a reconstructed value of the second-type pixel according to the reconstructed value of the first-type pixel using an interpolation method.

Therefore, in this embodiment of the present application, a first-type pixel is reconstructed according to quantized transform coefficients and a predicted value of the first-type pixel (one part of pixels), to obtain a reconstructed value of the first-type pixel. In addition, second-type pixel (the other part of pixels) are directly reconstructed using an interpolation method that is based on reference pixels and/or the reconstructed part of pixels. Therefore, a bit rate is reduced. By means of the method for classifying a code block into two types of pixels and separately decoding the two types of pixels in different manners, flexible decoding can be performed, and decoding efficiency can be improved.

The method disclosed in the foregoing embodiment of the present application may be applied to the processor 1010, or may be implemented by the processor 1010. The processor 1010 may be an integrated circuit chip, and has a signal processing capability. In an implementation process, the steps in the foregoing method may be completed by means of an integrated logic circuit of hardware in the processor 1010 or an instruction in a form of software. The processor 1010 may be a general purpose processor, a DSP, an ASIC, an FPGA or another programmable logic device, a discrete gate or a transistor logic device, or a discrete hardware assembly. The processor 1010 may implement or perform the methods, the steps, and the logical block diagrams disclosed in the embodiments of the present application. The general purpose processor may be a microprocessor, or the processor 1010 may be any conventional processor, or the like. The steps of the method disclosed with reference to the embodiments of the present application may be directly performed and completed by a hardware decoding processor, or may be performed and completed by a combination of a hardware module and a software module in a decoding processor. The software module may be located in a mature storage medium in the art, such as a RAM, a flash memory, a ROM, a PROM or an EEPROM, or a register. The storage medium is located in the memory 1020. The processor 1010 reads information from the memory 1020, and completes the steps of the foregoing method in combination with hardware of the processor 1010. In addition to a data bus, the bus system 1030 may further include a power bus, a control bus, a status signal bus, and the like. However, for clear description, various types of buses in the figure are marked as the bus system 1030.

It should be understood that the current picture block may be any one or one type of picture block in a current frame. The picture block in this embodiment of the present application may be in multiple sizes, for example, may be in a size of 3×3, 4×4, 8×8, 16×16, 32×32, 64×64, 8×4, 4×8, 16×12, or 9×9. This embodiment of the present application is not limited thereto.

It should be noted that a first-type pixel may be a pixel at any location in the current picture block. For example, the first-type pixel may be at a location such as a right boundary, a lower boundary, a center, an upper-right to lower-left diagonal, an upper-left to lower-right diagonal, or the like in the current picture block. A quantity of first-type pixels is greater than 0 and is less than a quantity of pixels in the entire current picture block. For example, the quantity of first-type pixels is ½, 7/16, 15/32, ¾, ¼, or the like of the quantity of pixels in the entire current picture block. The second-type pixel is a pixel in the picture block except the first-type pixel.

FIGS. 2A-2H are classification examples of first-type pixels and second-type pixels in a 4×4 picture block according to an embodiment of the present application. Eight examples are given in FIG. 2A to FIG. 2H. In an example of this embodiment, a classification case of first-type pixels and second-type pixels in FIG. 2A may be used.

It should be understood that classification of first-type pixels and second-type pixels in a larger picture block may be considered as a combination of multiple small picture blocks. For example, pixel classification of an 8×8 picture block or a larger picture block may be a combination of pixel classification of four or more picture blocks each with a size that is smaller than a size of the picture block. For example, pixel classification of an 8×8 block in an example in FIG. 3A is obtained by repeatedly using the pixel classification of the 4×4 block in an example in FIG. 2A, that is, pixel classification of each of four 4×4 blocks in the 8×8 block is performed using the pixel classification method of the 4×4 block in the example in FIG. 2A. Alternatively, pixel classification of an 8×8 block or a larger block may be performed in another manner, for example, in a pixel classification manner in FIG. 2B, FIG. 2C, or FIG. 2D. Same pixel classification may be used for all intra-frame prediction modes, or different pixel classification may be used for each intra-frame prediction mode, or same pixel classification may be used for several intra-frame prediction modes. For brief description, an example of using the pixel classification method in FIG. 2A for a 4×4 picture block is mainly used in the following embodiment to describe a specific processing method.

It should be understood that the intra-frame prediction algorithm may include directional prediction, DC prediction, or planar prediction in H.265/HEVC or H.264/AVC, or may be intra-frame prediction that is based on template matching, or the like. This is not limited in this embodiment of the present application.

It should be understood that when the predicted value of the first-type pixel is generated using the intra-frame prediction algorithm, a predicted value of the second-type pixel may be further generated.

It should be further understood that according to this embodiment of the present application, a decoding device and an encoding device may be a same device, or a decoding device and an encoding device may be different devices. This is not limited in this embodiment of the present application.

Optionally, in another embodiment, the processor 1010 is further configured to place the transform coefficients at first-type preset locations in a transform coefficient matrix in a transform coefficient scanning order, where transform coefficients at second-type preset locations in the transform coefficient matrix are set to preset values, and a sum of a quantity of the second-type preset locations and a quantity of the first-type preset locations is equal to a total quantity of transform coefficients in the transform coefficient matrix.

Optionally, in another embodiment, the processor 1010 is further configured to determine the interpolation method according to the intra-frame prediction algorithm, where an interpolation manner in the interpolation method is the same as an interpolation manner included in the intra-frame prediction algorithm.

Alternatively, in another embodiment, the processor 1010 is further configured to determine the interpolation method according to a bit-stream of the picture block.

It should be understood that the decoder 1000 shown in FIG. 10 corresponds to the decoder 800 shown in FIG. 8, and can implement the processes completed by the decoder in the method embodiment in FIG. 6. For other functions and operations of the decoder 1000, refer to the processes of the decoder in the method embodiment in FIG. 6. To avoid repetition, details are not described herein again.

It should be understood that "an embodiment" or "one embodiment" described in this whole specification does not mean that particular features, structures, or characteristics related to the embodiment are included in at least one embodiment of the present application. Therefore, "in an embodiment" or "in one embodiment" appearing throughout this specification does not necessarily refer to a same embodiment. In addition, these particular features, structures, or characteristics may be combined in one or more embodiments in any appropriate manner. It should be understood that sequence numbers of the foregoing processes do not mean execution orders in various embodiments of the present application. The execution orders of the processes should be determined according to functions and internal logic of the processes, and should not be construed as any limitation on the implementation processes of the embodiments of the present application.

In addition, the terms "system" and "network" in this specification may be used interchangeably in this specification. The term "and/or" in this specification describes only an association relationship for describing associated objects and represents that three relationships may exist. For example, A and/or B may represent the following three cases Only A exists, both A and B exist, and only B exists. In addition, the character "/" in this specification generally indicates an "or" relationship between the associated objects.

It should be understood that in the embodiments of the present application, "B corresponding to A" indicates that B is associated with A, and B may be determined according to A. However, it should be further understood that determining B according to A does not mean that B is determined according only to A, that is, B may alternatively be determined according to A and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, that is, may be located in one position, or may be distributed on a plurality of network units. A part or all of the units may be selected according to actual needs to achieve the objectives of the solutions of the embodiments of the present application.

In addition, function units in the embodiments of the present application may be integrated into one processing unit, or each of the units may exist alone physically, or two or more units are integrated into one unit. The integrated unit may be implemented in a form of hardware, or may be implemented in a form of a software function unit.

With descriptions of the foregoing embodiments, a person skilled in the art may clearly understand that the present application may be implemented by hardware, firmware, or a combination thereof. When the present application is implemented by software, the foregoing functions may be stored in a computer-readable medium or transmitted as one or more instructions or code in the computer-readable medium. The computer-readable medium includes a computer storage medium and a communications medium. The communications medium includes any medium that enables a computer program to be transmitted from one place to another. The storage medium may be any available medium accessible to a computer. The following provides an example but does not impose a limitation. The computer-readable medium may include a RAM, a ROM, an EEPROM, a compact disc ROM (CD-ROM), another optical disc storage or disk storage medium, another magnetic storage device, or any other medium that can carry or store expected program code in a form of an instruction or a data structure and can be accessed by a computer. In addition, any connection may be appropriately defined as a computer-readable medium. For example, if software is transmitted from a website, a server, or another remote source using a coaxial cable, an optical fiber cable, a twisted pair, a digital subscriber line (DSL), or wireless technologies such as infrared ray, radio and microwave, the coaxial cable, optical fiber cable, twisted pair, DSL or wireless technologies such as infrared ray, radio and microwave are included in fixation of a medium to which they belong. For example, a disk and disc used in the present application includes a compact disc (CD), a laser disc, an optical disc, a digital versatile disc (DVD), a FLOPPY DISK, and a BLU-RAY DISC. The disk generally copies data by a magnetic means, and the disc copies data optically by a laser means. The foregoing combination should also be included in the protection scope of the computer-readable medium.

In summary, what is described above is merely example embodiments of the technical solutions of the present application, but is not intended to limit the protection scope of the present application. Any modification, equivalent replacement, or improvement made without departing from the spirit and principle of the present application shall fall within the protection scope of the present application.

What is claimed is:

1. An intra-frame decoding method, comprising:
   obtaining reference pixel values of a current picture block;
   obtaining a predicted value of a first-type pixel in the current picture block according to the reference pixel values of the current picture block using an intra-frame prediction algorithm, wherein the current picture block comprises the first-type pixel and a second-type pixel, and wherein the second-type pixel is a pixel in the current picture block except the first-type pixel;
   dequantizing quantized transform coefficients of the current picture block to obtain transform coefficients;
   placing the transform coefficients at first-type preset locations in a transform coefficient matrix in a transform coefficient scanning order, wherein transform coefficients at second-type preset locations in the transform coefficient matrix are set to preset values, and a sum of a quantity of the second-type preset locations and a quantity of the first-type preset locations is equal to a total quantity of transform coefficients in the transform coefficient matrix;
   inversely transforming the transform coefficients to obtain reconstructed residual values of the first-type pixel, wherein an inverse transform and the current picture block have a common size;
   adding the reconstructed residual values of the first-type pixel and the predicted value of the first-type pixel to obtain a reconstructed value of the first-type pixel; and
   obtaining a reconstructed value of the second-type pixel according to the reconstructed value of the first-type pixel using an interpolation method.

2. The method according to claim 1, wherein before obtaining the reconstructed value of the second-type pixel, the method further comprises determining the interpolation method according to the intra-frame prediction algorithm, and wherein an interpolation manner in the interpolation method is the same as an interpolation manner comprised in the intra-frame prediction algorithm.

3. The method according to claim 1, wherein before obtaining the reconstructed value of the second-type pixel, the method further comprises determining the interpolation method according to a bit-stream of the current picture block.

4. The method according to claim 1, wherein before obtaining the reconstructed value of the second-type pixel, the method further comprises determining the interpolation method according to the intra-frame prediction algorithm, and wherein an interpolation manner in the interpolation method is the same as an interpolation manner comprised in the intra-frame prediction algorithm.

5. The method according to claim 1, wherein before obtaining the reconstructed value of the second-type pixel, the method further comprises determining the interpolation method according to a bit-stream of the current picture block.

6. An apparatus implemented as an encoder, comprising:
a non-transitory computer readable memory comprising instructions-; and
a processor coupled to the memory, wherein the instructions cause the processor to be configured to:
obtain reference pixel values of a current picture block;
obtain a predicted value of a first-type pixel in the current picture block according to the reference pixel values of the current picture block using an intra-frame prediction algorithm, wherein the current picture block comprises the first-type pixel and a second-type pixel, and wherein the second-type pixel is a pixel in the current picture block except the first-type pixel;
obtain residual values of the first-type pixel according to the predicted value of the first-type pixel and an original pixel value of the first-type pixel;
obtain transform coefficients according to the residual values of the first-type pixel;
quantize the transform coefficients in a transform coefficient scanning order to obtain quantized transform coefficients according to a formula $C'_m = Q(C_m + \Delta_m)$, wherein $$\Delta_m = \frac{1}{b_{m,m}} \sum_{j=m+1}^{N} b_{m,j}(C_j - C'_j),$$

wherein $C_m$ is an $m^{th}$ transform coefficient in the transform coefficient scanning order except fixed 0 coefficients, wherein $C'_m$ is a quantized transform coefficient of $C_m$, wherein $Q(*)$ is a quantization processing function, wherein $\Delta_m$ is a correction term depending on a quantization error of a transform coefficient after $C_m$, wherein $b_{m,j}$ is a weighting coefficient depending on a transform matrix and a locations of the first-type pixel in the transform coefficient scanning order, wherein m=1, 2, . . . , M, wherein M is a quantity of first-type pixels, and wherein N is a total quantity of first-type pixels and second-type pixels;
reconstruct the first-type pixel according to the quantized transform coefficients and the predicted value of the first-type pixel to obtain a reconstructed value of the first-type pixel; and
obtain a reconstructed value of the second-type pixel according to the reconstructed value of the first-type pixel using an interpolation method.

7. The apparatus according to claim 6, wherein the instructions further cause the processor to be configured to determine the interpolation method according to the intra-frame prediction algorithm, and wherein an interpolation manner in the interpolation method is the same as an interpolation manner comprised in the intra-frame prediction algorithm.

8. The apparatus according to claim 6, wherein the instructions further cause the processor to be configured to:
obtain residual values of B pixels in the second-type pixel according to the residual values of the first-type pixel, wherein B is a positive integer that is not less than 1; and
transform the residual values of the first-type pixel and the residual values of the B pixels to obtain the transform coefficients, wherein a quantity of fixed 0 coefficients in the transform coefficients is equal to B.

9. The apparatus according to claim 8, wherein a quantity of the residual values of the first-type pixel is A, wherein the B pixels in the second-type pixel correspond to B residual values, wherein A residual values are in a one-to-one correspondence with pixels in the first-type pixel, wherein the B residual values are in a one-to-one correspondence with the B pixels, and wherein the instructions further cause the processor to be configured to:
determine a B×A matrix corresponding to the quantity of the residual values of the first-type pixel and a quantity B of the residual values of the B pixels in the second-type pixel;
multiply the B×A matrix by a column vector comprising the residual values of the first-type pixel to obtain a column vector comprising the residual values of the B pixels in the second-type pixel; and
obtain the residual values of the B pixels in the second-type pixel according to the column vector comprising the residual values of the B pixels in the second-type pixel.

10. The apparatus according to claim 6, wherein the instructions further cause the processor to be configured to:
subtract a predicted value of each pixel from an original value of each of at least one pixel in the second-type pixel to obtain a residual value of each pixel, wherein the predicted value of each pixel is obtained using the intra-frame prediction algorithm; and
transform the residual values of the first-type pixel and a residual value of the at least one pixel in the second-type pixel to obtain the transform coefficients.

11. The apparatus according to claim 6, wherein the instructions further cause the processor to be configured to perform subtraction between the original pixel value of the first-type pixel and the predicted value of the first-type pixel to obtain the residual values of the first-type pixel.

12. An apparatus implemented as a decoder, comprising:
a non-transitory computer readable memory comprising instructions; and
a processor coupled to the memory, wherein the instructions cause the processor to be configured to:
obtain reference pixel values of a current picture block;
obtain a predicted value of a first-type pixel in the current picture block according to the reference pixel values of the current picture block using an intra-frame prediction algorithm, wherein the current picture block comprises the first-type pixel and a second-type pixel, and wherein the second-type pixel is a pixel in the current picture block except the first-type pixel;
dequantize quantized transform coefficients of the current picture block to obtain transform coefficients;
place the transform coefficients at first-type preset locations in a transform coefficient matrix in a transform coefficient scanning order, wherein transform coefficients at second-type preset locations in the transform coefficient matrix are set to preset values, and a sum of a quantity of the second-type preset locations and a quantity of the first-type preset locations is equal to a total quantity of transform coefficients in the transform coefficient matrix;
inversely transform the transform coefficients to obtain reconstructed residual values of the first-type pixel;

add the reconstructed residual values of the first-type pixel and the predicted value of the first-type pixel to obtain a reconstructed value of the first-type pixel, wherein an inverse transform and the current picture block have a common size; and obtain a reconstructed value of the second-type pixel according to the reconstructed value of the first-type pixel using an interpolation method.

13. The apparatus according to claim 12, wherein the instructions further cause the processor to be configured to determine the interpolation method according to the intra-frame prediction algorithm, and wherein an interpolation manner in the interpolation method is the same as an interpolation manner comprised in the intra-frame prediction algorithm.

14. The apparatus according to claim 12, wherein the instructions further cause the processor to be configured to determine the interpolation method according to a bit-stream of the current picture block.

15. The apparatus according to claim 12, wherein the instructions further cause the processor to be configured to determine the interpolation method according to the intra-frame prediction algorithm, and wherein an interpolation manner in the interpolation method is the same as an interpolation manner comprised in the intra-frame prediction algorithm.

16. The apparatus according to claim 12, wherein the instructions further cause the processor to be configured to determine the interpolation method according to a bit-stream of the current picture block.

* * * * *

UNITED STATES PATENT AND TRADEMARK OFFICE
CERTIFICATE OF CORRECTION

PATENT NO. : 10,412,393 B2
APPLICATION NO. : 15/694440
DATED : September 10, 2019
INVENTOR(S) : Bing Zeng et al.

Page 1 of 1

It is certified that error appears in the above-identified patent and that said Letters Patent is hereby corrected as shown below:

In the Claims

Claim 6, Column 39, Line 6: "instructions-; and" should read "instructions; and"

Signed and Sealed this
Fifth Day of November, 2019

Andrei Iancu
*Director of the United States Patent and Trademark Office*